(12) United States Patent
Ditges et al.

(10) Patent No.: US 10,918,227 B2
(45) Date of Patent: Feb. 16, 2021

(54) UNIVERSAL ACCESSORY MOUNT AND ASSOCIATED MOUNTING SYSTEMS

(71) Applicant: Source Communications, LLP, Broomfield, CO (US)

(72) Inventors: Jeffrey R. Ditges, Broomfield, CO (US); Eric Layton, Broomfield, CO (US)

(73) Assignee: Source Communications, LLP, Broomfield, CO (US)

( * ) Notice: Subject to any disclaimer, the term of this patent is extended or adjusted under 35 U.S.C. 154(b) by 0 days.

(21) Appl. No.: 16/228,094

(22) Filed: Dec. 20, 2018

(65) Prior Publication Data
US 2019/0223629 A1 Jul. 25, 2019

Related U.S. Application Data

(60) Provisional application No. 62/641,293, filed on Mar. 10, 2018, provisional application No. 62/620,342, filed on Jan. 22, 2018.

(51) Int. Cl.
| | |
|---|---|
| *A47F 10/02* | (2006.01) |
| *F16M 13/02* | (2006.01) |
| *F16M 11/10* | (2006.01) |
| *F16B 1/00* | (2006.01) |
| *F16M 11/08* | (2006.01) |
| *F16M 11/04* | (2006.01) |
| *F16M 11/20* | (2006.01) |

(52) U.S. Cl.
CPC ............... *A47F 10/02* (2013.01); *F16B 1/00* (2013.01); *F16M 11/041* (2013.01); *F16M 11/10* (2013.01); *F16M 11/2014* (2013.01); *F16M 13/022* (2013.01); *F16B 2001/0035* (2013.01); *F16M 2200/022* (2013.01); *F16M 2200/08* (2013.01)

(58) Field of Classification Search
CPC ......... A47F 10/02; F16B 1/00; F16M 11/041; F16M 11/10; F16M 11/08; F16M 11/2014; F16M 13/022; F16M 2001/0035; F16M 2200/022; F16M 2200/08
USPC ........ 248/346.01, 371, 921, 415, 418, 206.5
See application file for complete search history.

(56) References Cited

U.S. PATENT DOCUMENTS

| | | | | |
|---|---|---|---|---|
| 5,895,022 | A * | 4/1999 | Kim ...................... | F16M 11/10 248/398 |
| 6,116,560 | A * | 9/2000 | Kim ...................... | F16M 11/10 248/371 |
| RE37,712 | E | 5/2002 | Gannon | |
| 7,273,202 | B2 * | 9/2007 | Tien ...................... | F16M 11/08 248/289.31 |
| 7,628,375 | B2 * | 12/2009 | Jung ..................... | F16M 11/08 248/122.1 |
| 9,185,818 | B2 * | 11/2015 | Lee ..................... | F16M 11/2092 |
| D750,515 | S * | 3/2016 | Ditges ........................... | D10/74 |
| 9,968,188 | B1 * | 5/2018 | Floersch ............... | F16M 13/00 |

* cited by examiner

*Primary Examiner* — Tan Le
(74) *Attorney, Agent, or Firm* — Lathrop GPM LLP

(57) ABSTRACT

A universal mount includes a base portion having a support mount, a mount extension integral to the base portion, and a mounting plate rotatably attached to the mount extension. The universal mount may operate to accommodate a variety of mounting accessories.

23 Claims, 25 Drawing Sheets

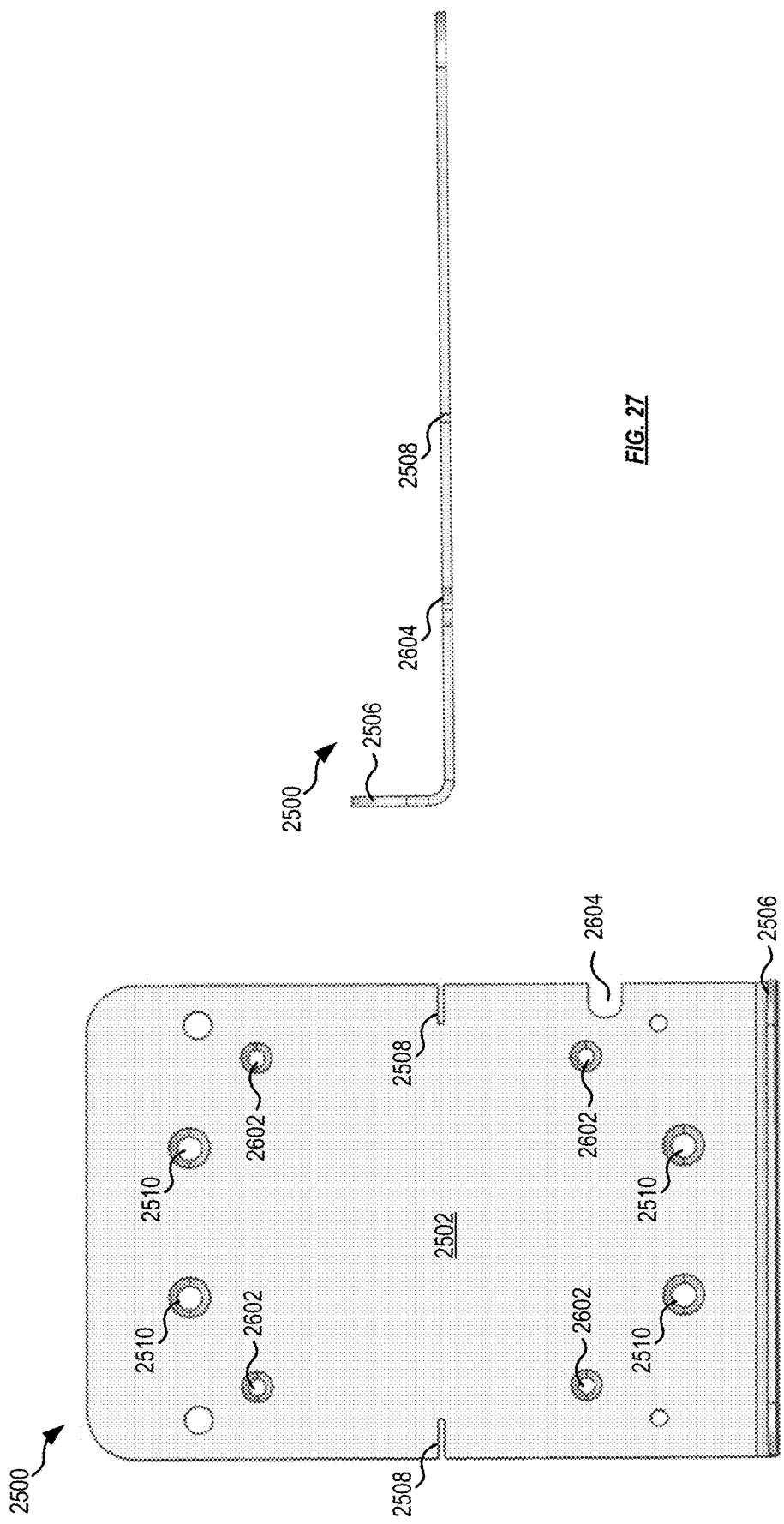

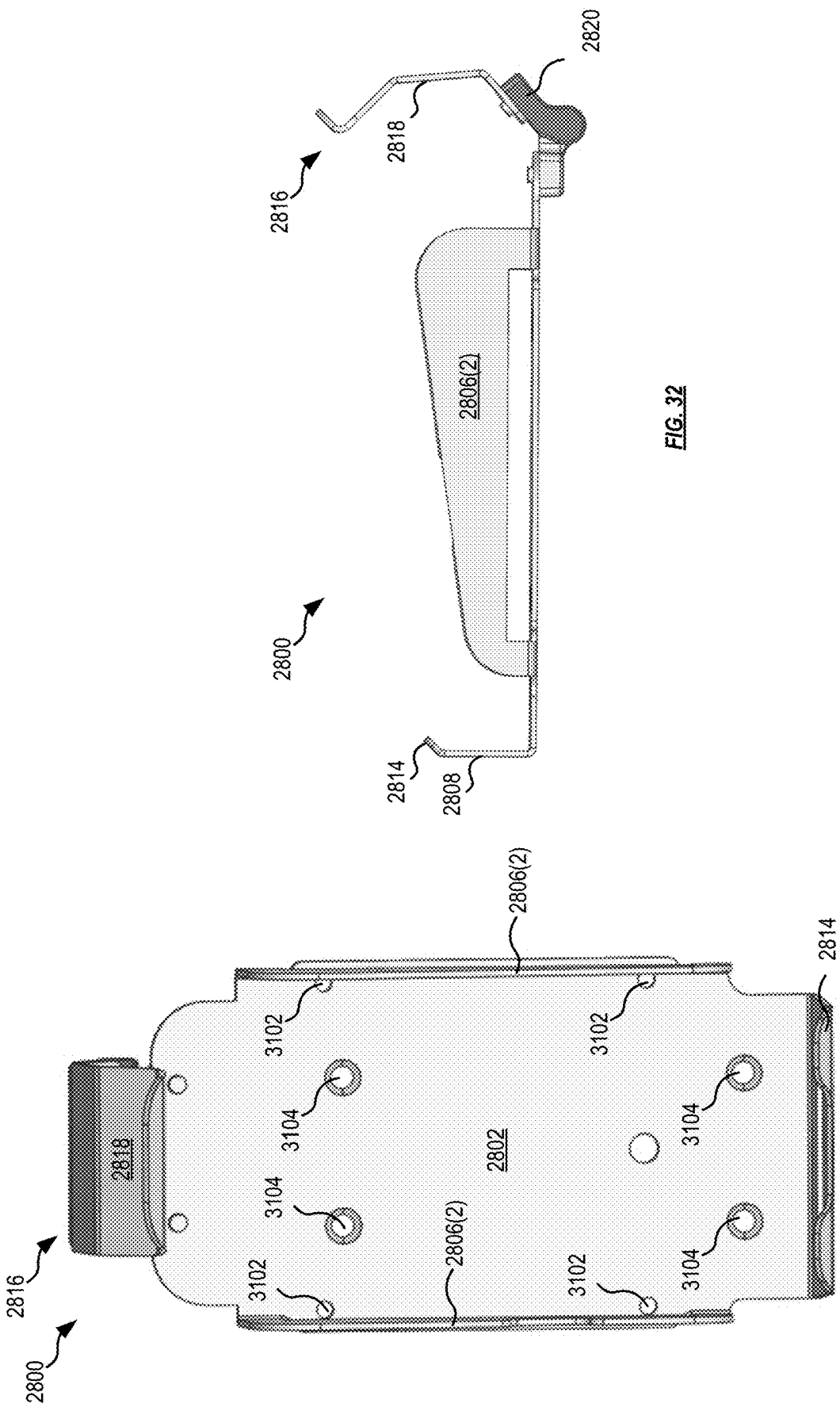

UNIVERSAL ACCESSORY MOUNT AND ASSOCIATED MOUNTING SYSTEMS

CROSS-REFERENCE TO RELATED APPLICATIONS

This application claims priority to U.S. Provisional Application Ser. No. 62/620,342, filed Jan. 22, 2018, and U.S. Provisional Application Ser. No. 62/641,293, filed Mar. 10, 2018. Each of the aforementioned applications are incorporated by reference herein in their entireties.

BACKGROUND

Electronics development has fueled a rise in automated systems, such as automated point of sale. Consumers are directly interacting with these automated systems to perform transactions, and other actions. The electronics that implement these transactions and other actions are continuously changing, and have various shapes and sizes.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

FIG. 26 depicts a top elevation view of the mounting accessory of FIG. 25, in embodiments.

FIG. 27 depicts a side plan view of the mounting accessory of FIGS. 25-26, in embodiments.

FIG. 31 depicts a top elevation of the mounting accessory of FIG. 28, in embodiments.

FIG. 32 depicts a side view of the mounting accessory of FIG. 28, in embodiments.

DETAILED DESCRIPTION OF THE EMBODIMENTS

Figure 1:
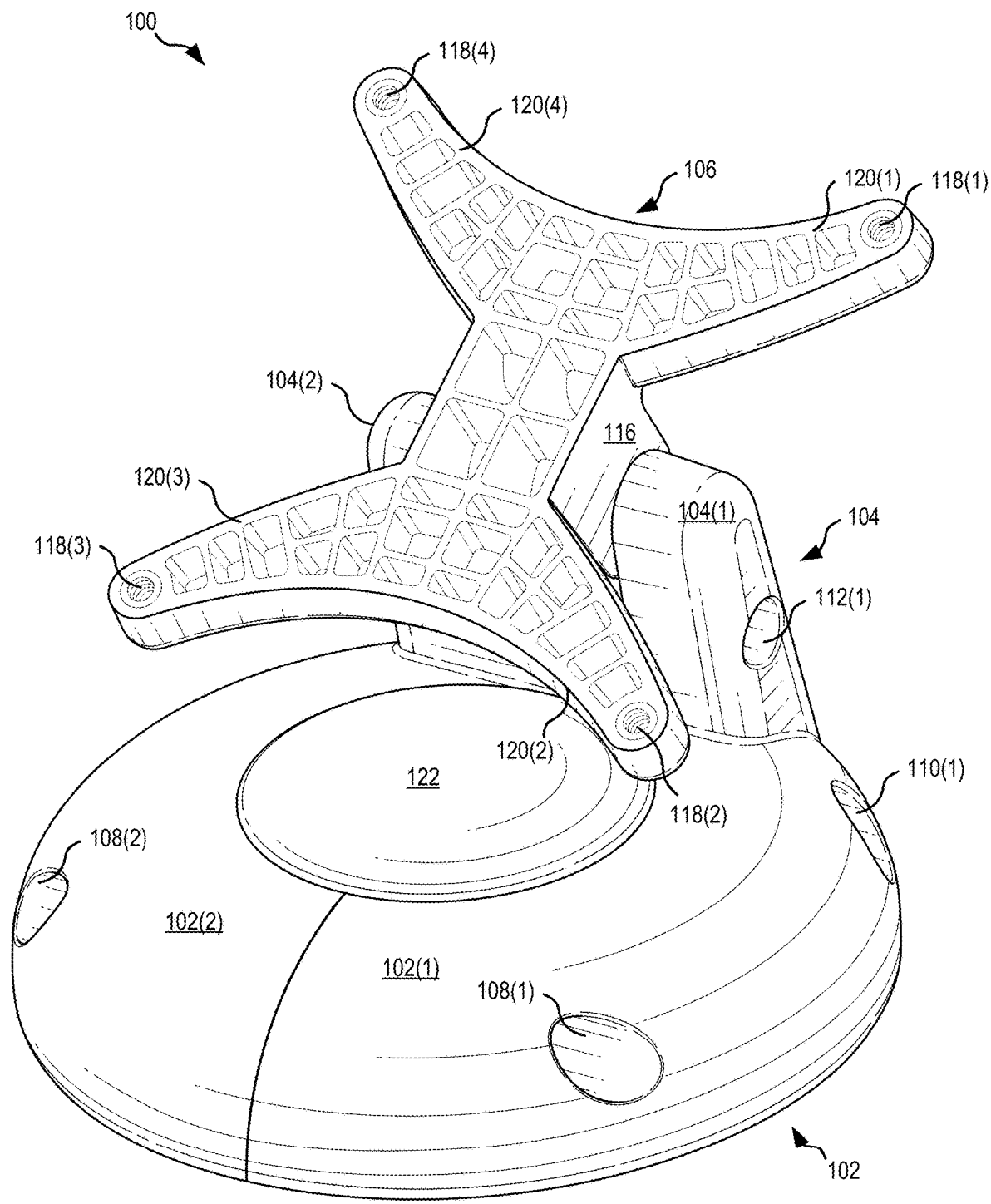
FIG. 1 depicts a front perspective view of a universal accessory mount, in embodiments.
Figure 2:
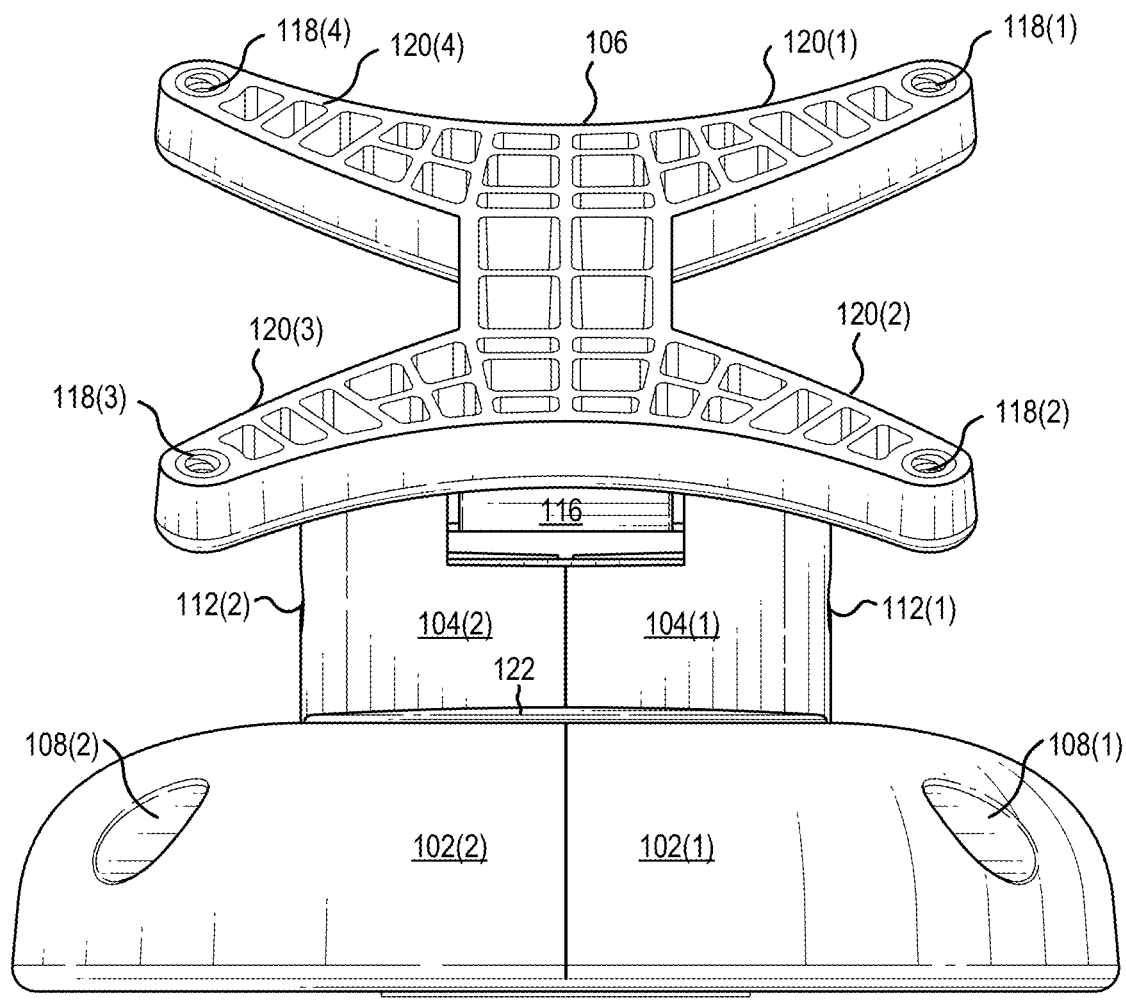
FIG. 2 depicts a front elevation view of the universal accessory mount of FIG. 1.
Figure 3:
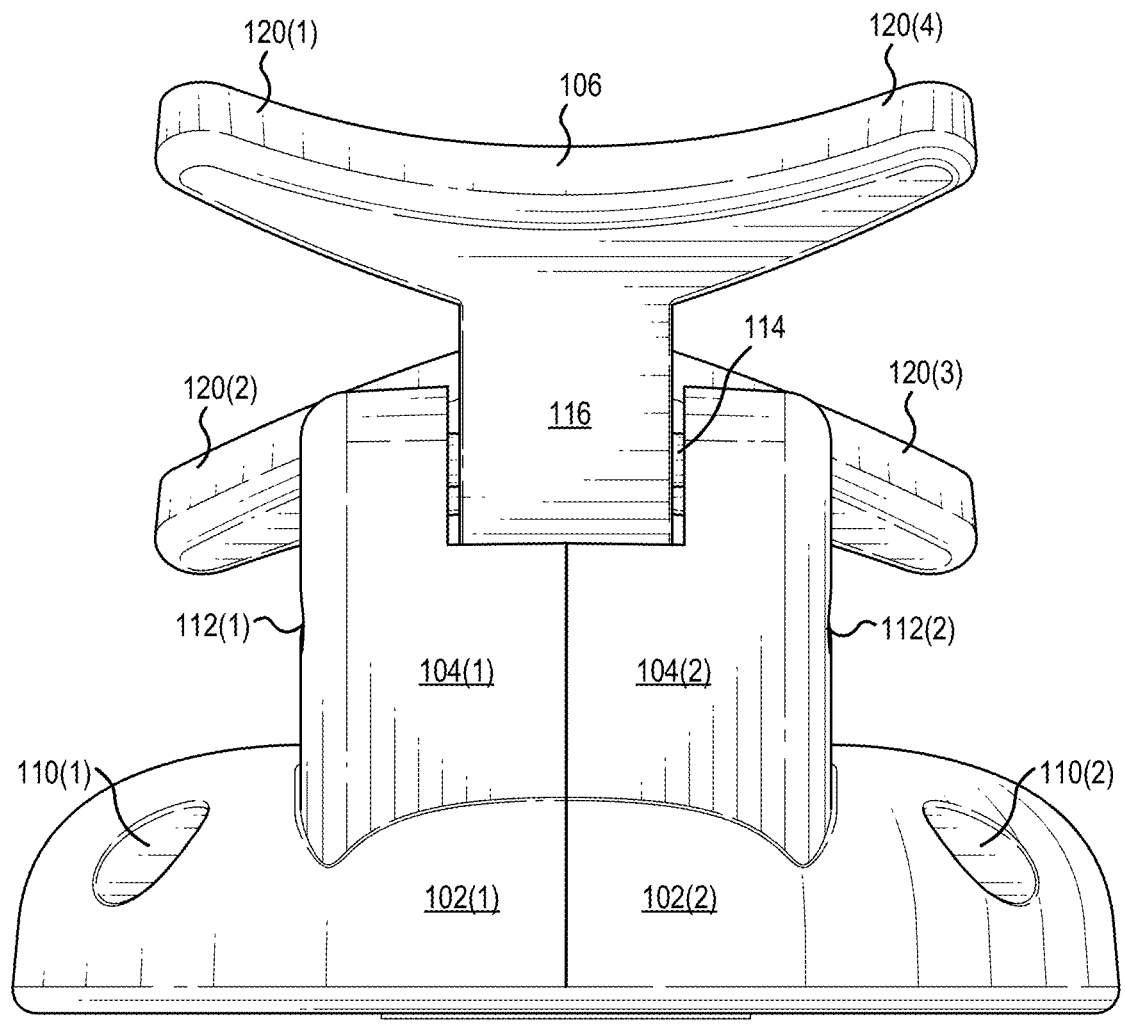
FIG. 3 depicts a rear elevation view of the universal accessory mount of FIG. 1.
Figure 4:
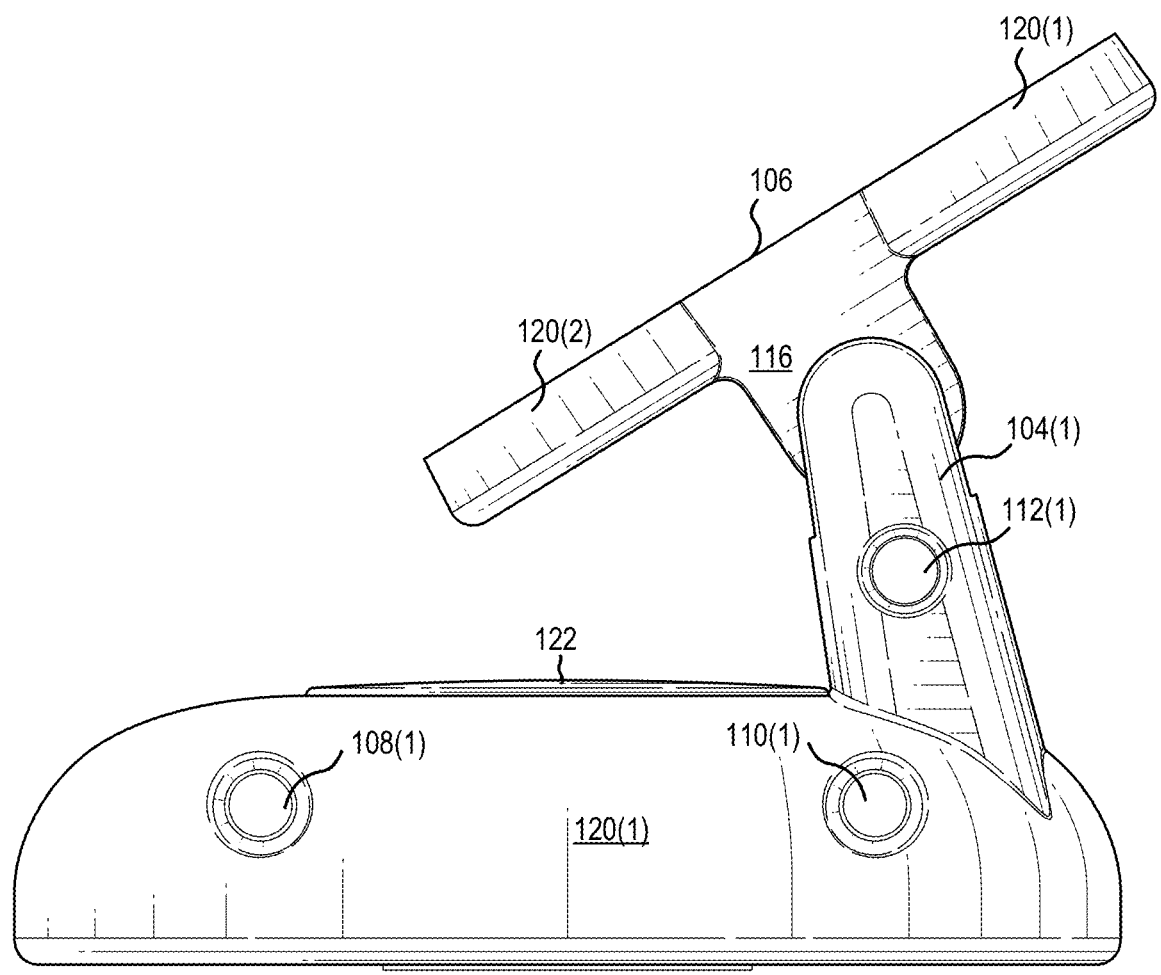
FIG. 4 depicts a left elevation view of the universal accessory mount of FIG. 1, with the right elevation being a mirror image in embodiments.
Figure 5:
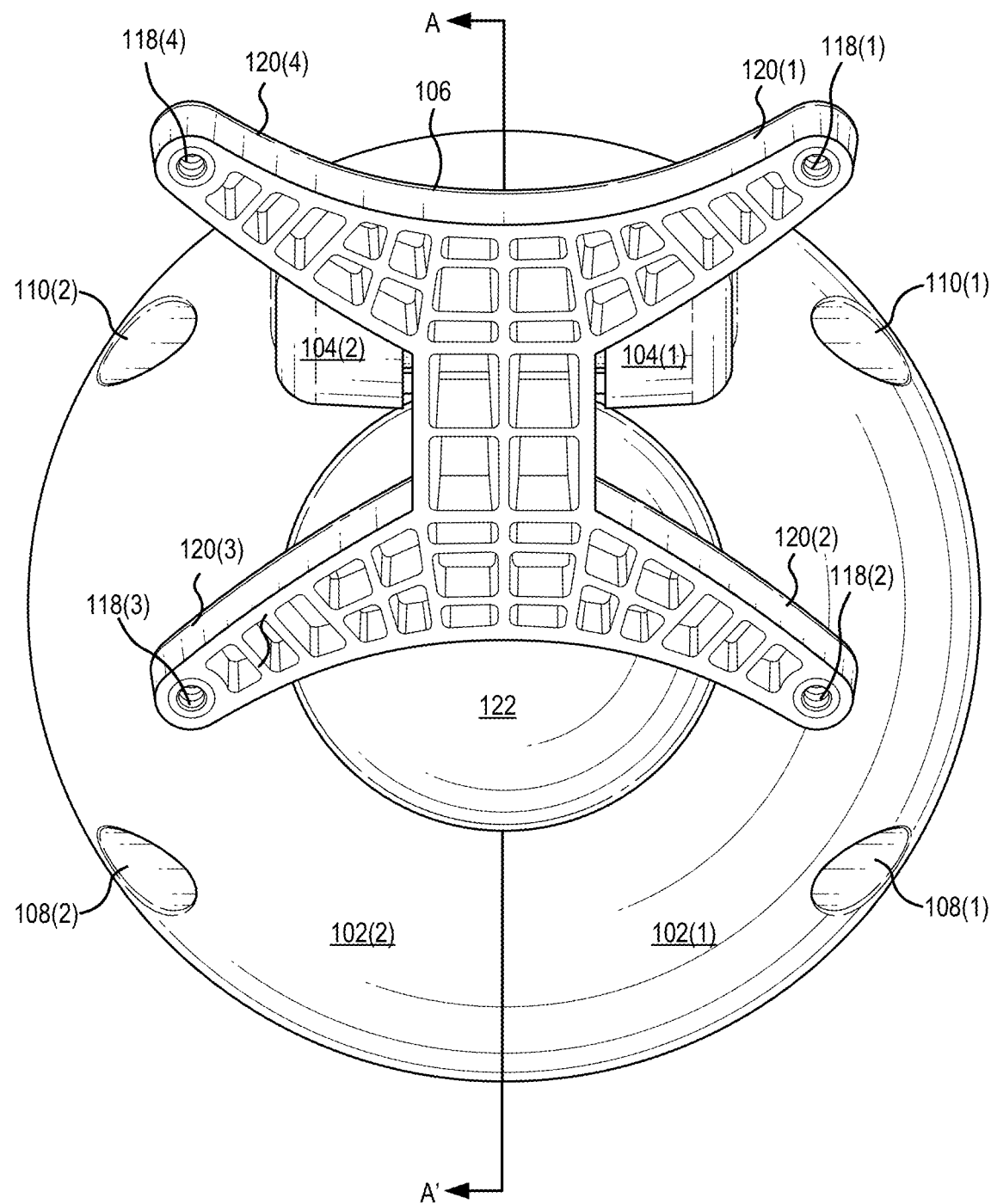
FIG. 5 depicts a top plan view of the universal accessory mount of FIG. 1.
Figure 6:
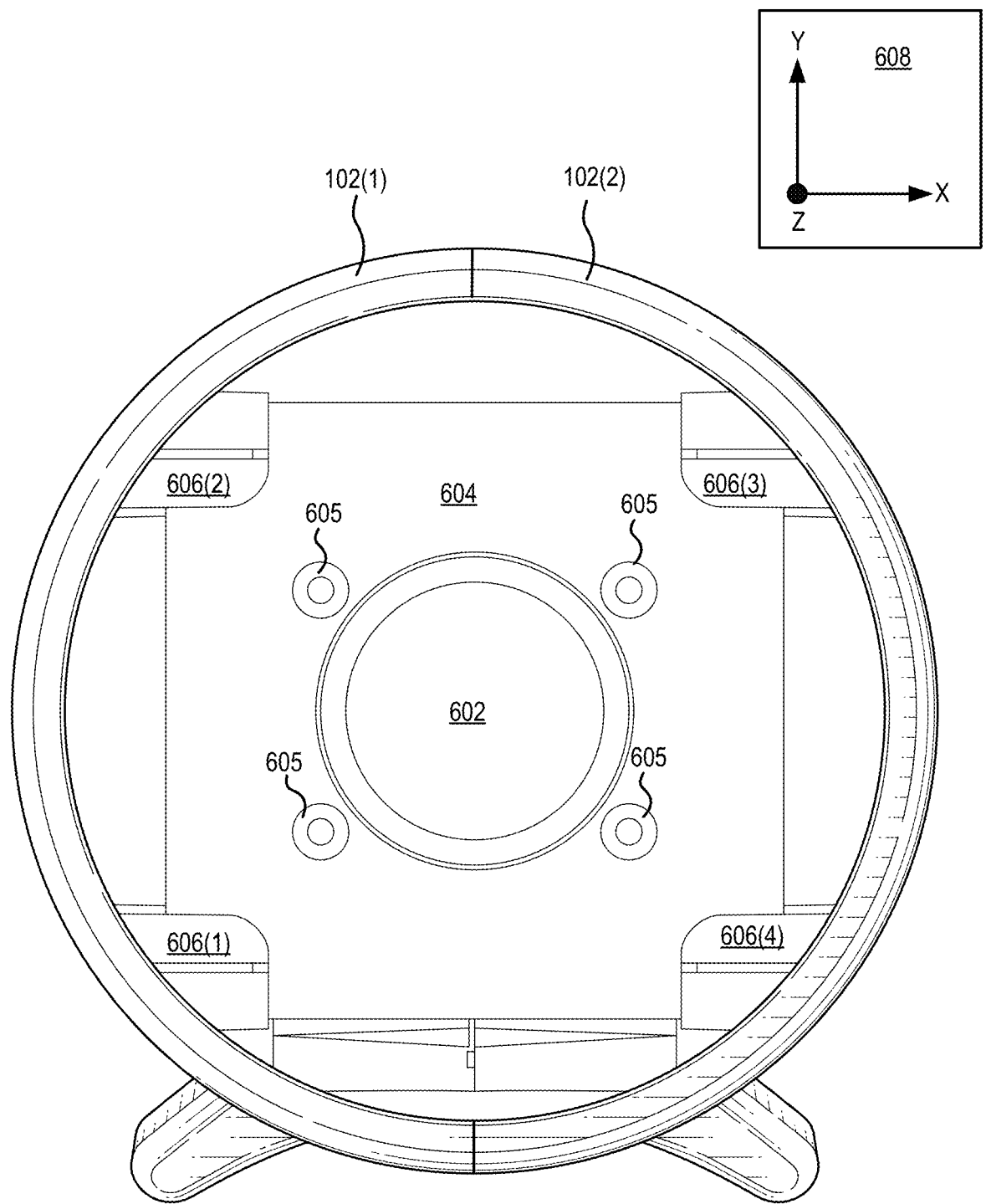
FIG. 6 depicts a bottom plan view of the universal accessory mount of FIG. 1.

FIG. 1 depicts a front perspective view of a universal accessory mount 100, in embodiments. FIG. 2 depicts a front elevation view of the universal accessory mount 100, of FIG. 1. FIG. 3 depicts a rear elevation view of the universal accessory mount 100, of FIG. 1. FIG. 4 depicts a left elevation view of the universal accessory mount 100, of FIG. 1, with the right elevation being a mirror image in embodiments. FIG. 5 depicts a top plan view of the universal accessory mount 100, of FIG. 1. FIG. 6 depicts a bottom plan view of the universal accessory mount 100, of FIG. 1. FIGS. 1-6 are best viewed together with the following description.

The universal accessory mount 100 includes a base 102 having a mount extension 104 extending upward therefrom. The mount extension 104 may be integral to the base (e.g. the base 102 and the mount extension are a single piece), or the mount extension 104 may be separate from the base 102 and attached thereto. A mounting plate 106 is rotatably coupled to the mount extension 104.

In embodiments, the base 102 includes a first base 102(1) and a second base 102(2) that couple together via one or more fasteners (such as a screw, nail, glue, snap-fastener, etc.) respectively located in fastener holes 108(1), 108(2), 110(1), and 110(2). Similarly, the mount extension 104, in embodiments, includes a first mount extension 104(1) and a second mount extension 104(2) that couple together via one or more fasteners respectively located in fastener hole(s) 112(1), 112(2). It should be appreciated that there may be more fasteners located in each fastener hole, and/or there may be more fastener holes than illustrated without departing from the scope hereof. Further, it should be appreciated that if the base 102 and the mount extension 104 are a single piece (e.g. without first/second base and first/second mount extension components), then there may not be any fasteners or fastener holes.

The base 102 may include a cover 122 that covers support mounting components within the base 102. As shown in FIG. 6, the support mounting components may include a support mount 602. In embodiments, the support mount 602 is fastened to a support plate 604. The support mount 602 may mount to the support plate at fastener apertures 605 and may include a magnet, or other mounting device that couples with a corresponding magnet (or other mounting device) located on a structure to which the universal mount 100 is attached to. If the support mount 602 is a magnet, this provides the advantage that the universal mount 100 may be removably attached to the structure for easily storing or relocating the universal mount 100 (and attached accessory). Moreover, the support mount 602 may allow the base 102 to swivel with respect to the structure such that a user may rotate the universal mount.

Figure 7:
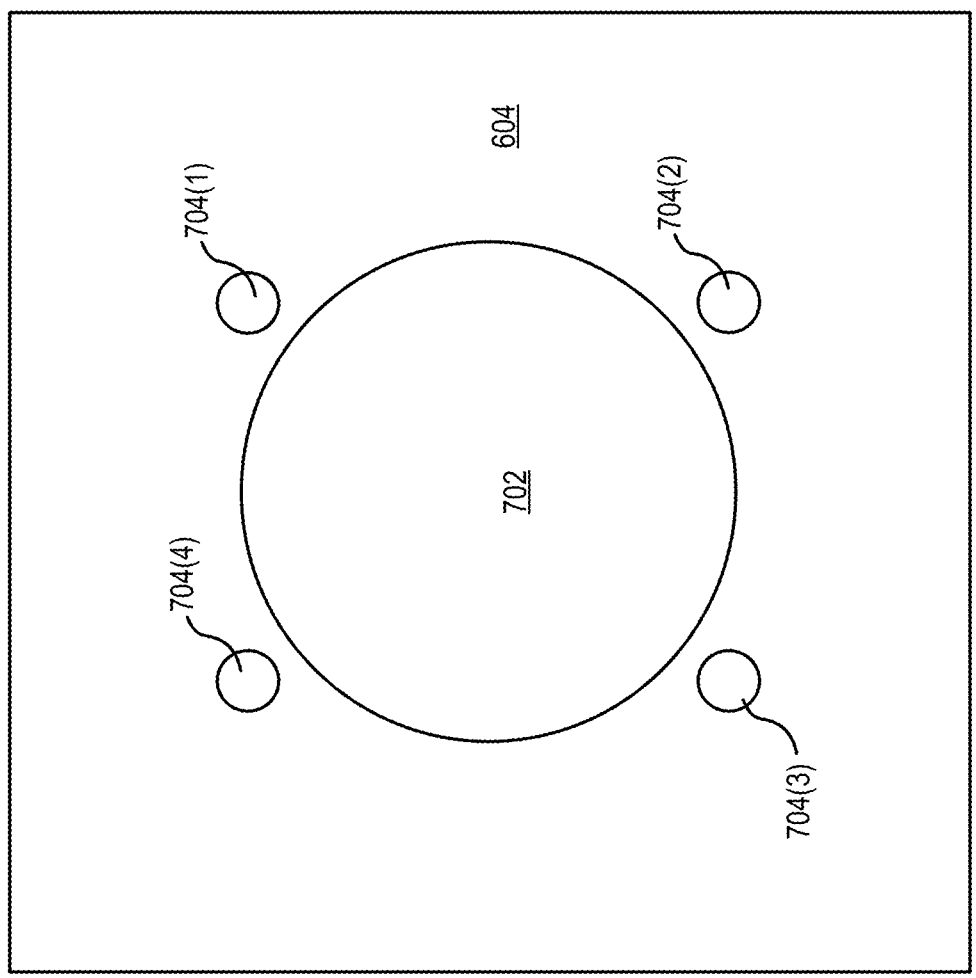
FIG. 7 is a top elevation view of the support plate of the universal mount of FIG. 1.

The support plate 604 may be retained in the base 102 via channels 606. The channels 606 may be integral to an inner surface of the base 102 such that when the first base 102(1) and the second base 102(2) are coupled together, the support plate 604 is retained within the channels 606 in a stationary position. As an example, the channels 606(1)-606(4) are collectively configured to prevent movement of the support plate 604 in the X-, Y-, and Z-axis with respect to the coordinate system 608 of FIG. 6. FIG. 7 is a top elevation view of the support plate 604. As shown, the support plate 604 includes a first aperture 702 for receiving the support mount 602, and additional apertures 704(1)-(4) for attaching a housing of the support mount 602 to the support plate 604.

The mounting plate 106 may couple to the mount extension 104 via a rod 114. Each end of the rod 114 may be held in place in one of the first mount extension 104(1) and the second mount extension 104(2). A protrusion 116 may extend from a rear surface of the mounting plate 106. The rod 114 may extend through the protrusion 116. In embodiments, the friction between the rod 114 and the protrusion 116 allows the mounting plate 106 to maintain a given angle with respect to the base 102 and the mounting extension 104, even when an accessory is mounted thereto.

The mounting plate 106 also includes one or more mounting fastener receptacles 118(1)-118(4). Mounting fastener receptacles 118(1)-118(4) maybe a threaded aperture that receives a screw, or it may be a corresponding fastener (such as a male/female component of a snap fastener). Although there are four mounting fastener receptacles shown, there may be more or fewer without departing from the scope hereof. Each mounting fastener receptacle 118(1)-118(4) is shown proximate an end of a respective mounting plate arm 120(1)-120(4).

Figure 8:
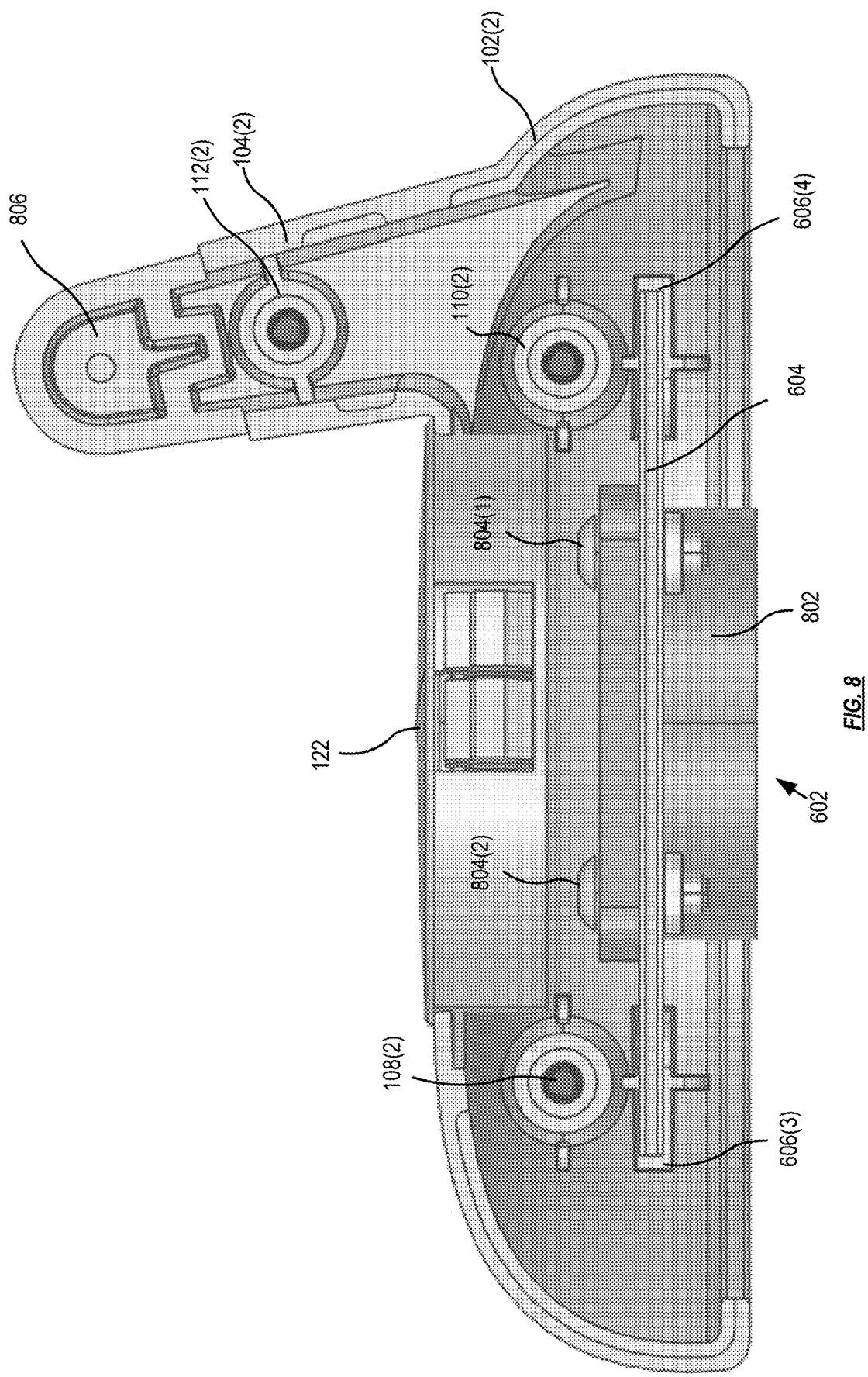
FIG. 8 depicts the base and the mounting extension of the universal mount of FIG. 1 along the cross-section A-A' of FIG. 5.

FIG. 8 depicts the base 102(2) and the mounting extension 104(2) along a cross-section A-A' of FIG. 5. The base 102(2) is shown including channels 606(3), 606(4) receiving the support plate 604. The support plate 604 is shown with a support mount housing 802 which may hold the support mount 602 in place. The support mount housing 802 is coupled to the support plate 604 via one or more fasteners 804(1), 804(2) which are located in the additional apertures 704(3)-(4) of FIG. 7, respectively. A rod recess 806 is also shown at an upper end of the mount extension 104(2) that receives the rod 114 (not shown in FIG. 8), and may fasten the rod 114 in place allowing the mounting plate 106 to rotate there around and maintain position when not being manipulated by a user. In embodiments, the rod 114 may be a clip friction hinge, such as that described in U.S. Pat. No. RE 37712 E1, entitled "Clip Friction Hinge", which is incorporated by reference in its entirety herewith.

Figure 9:
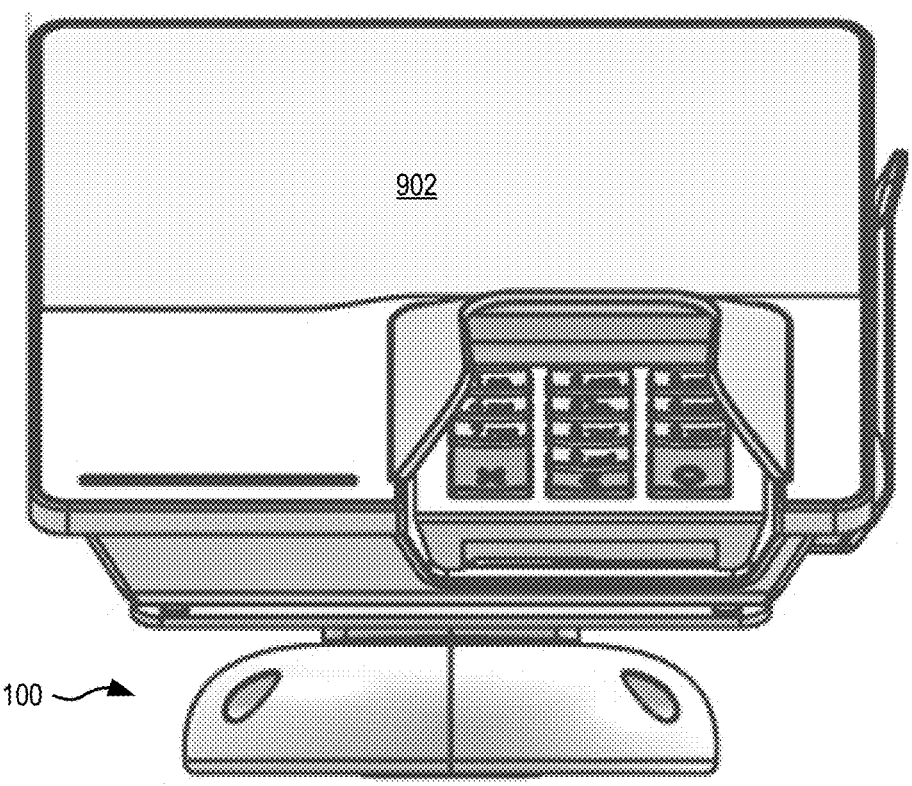
FIG. 9 depicts a front elevation view of the universal mount of FIG. 1, supporting a point-of-sale accessory, in embodiments.
Figure 10:
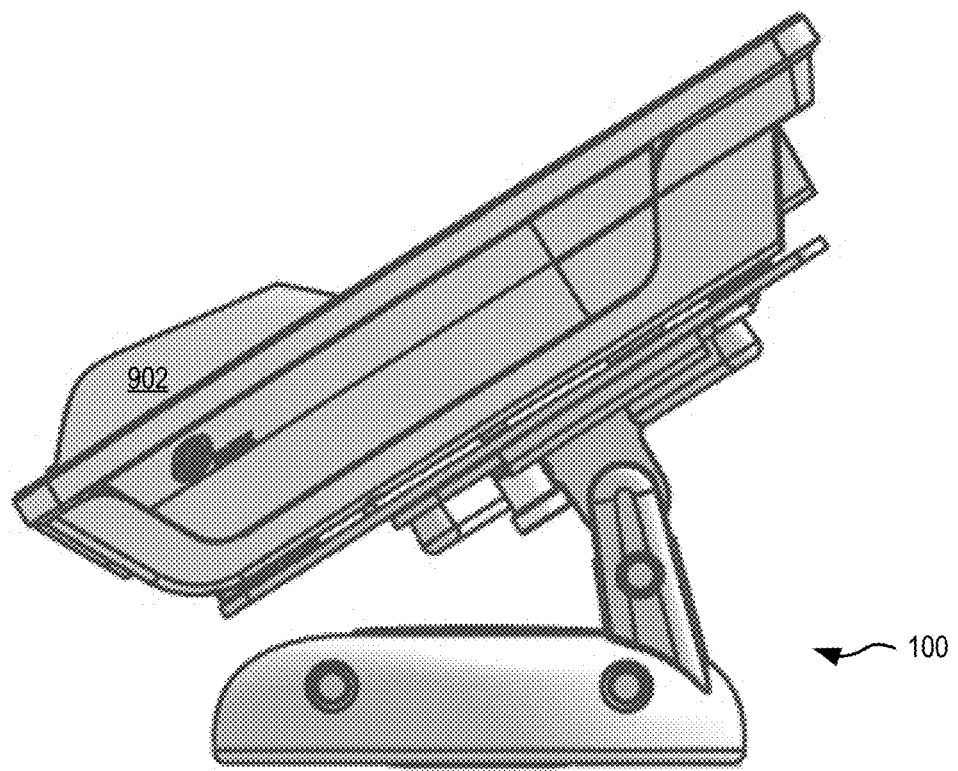
FIG. 10 depicts a side elevation view of the universal mount of FIG. 1, supporting the point-of-sale accessory of FIG. 9.
Figure 11:
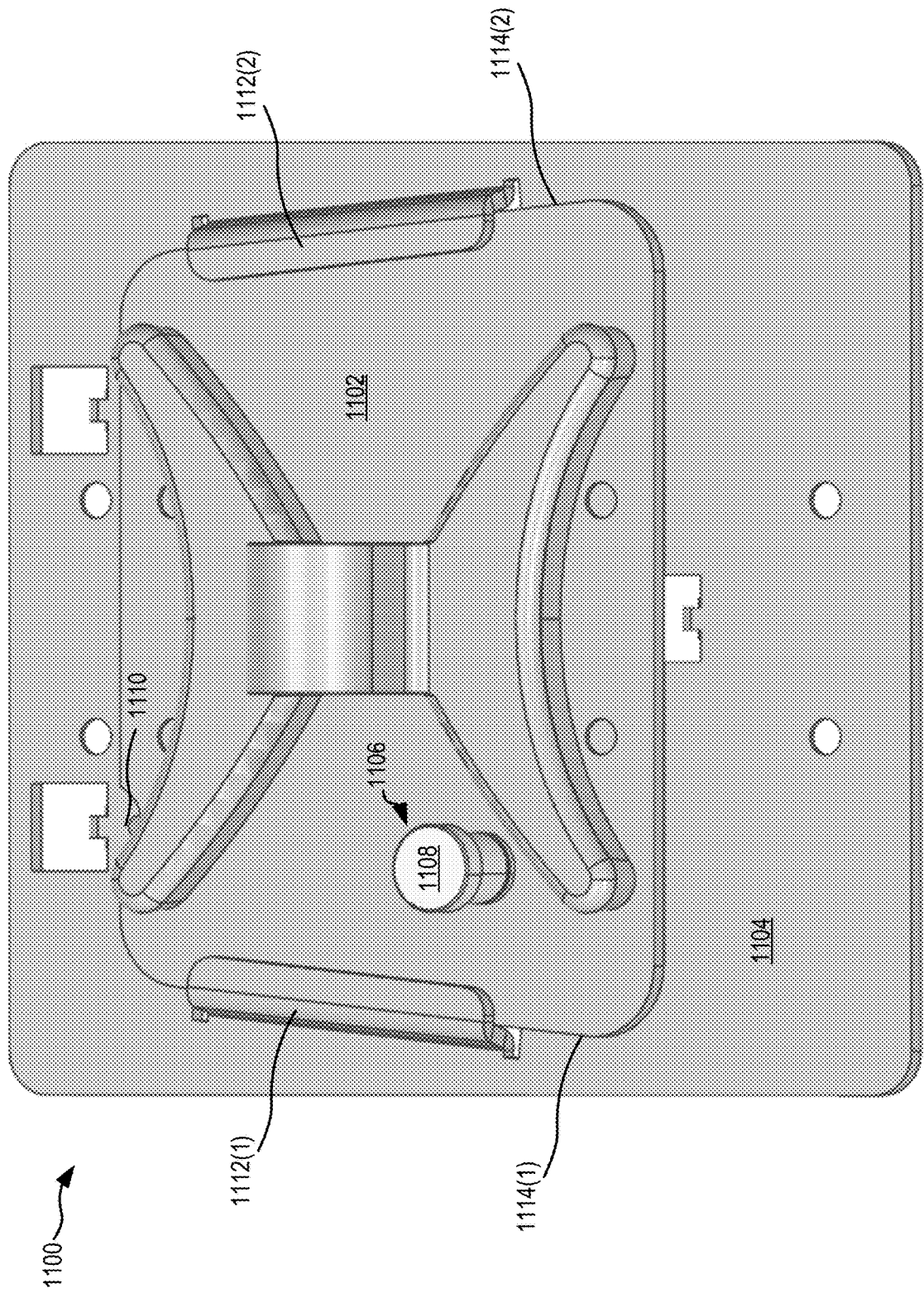
FIG. 11 depicts a bottom plan view of a mounting system, used to support the point-of-sale accessory of FIGS. 9-10, in embodiments.
Figure 12:
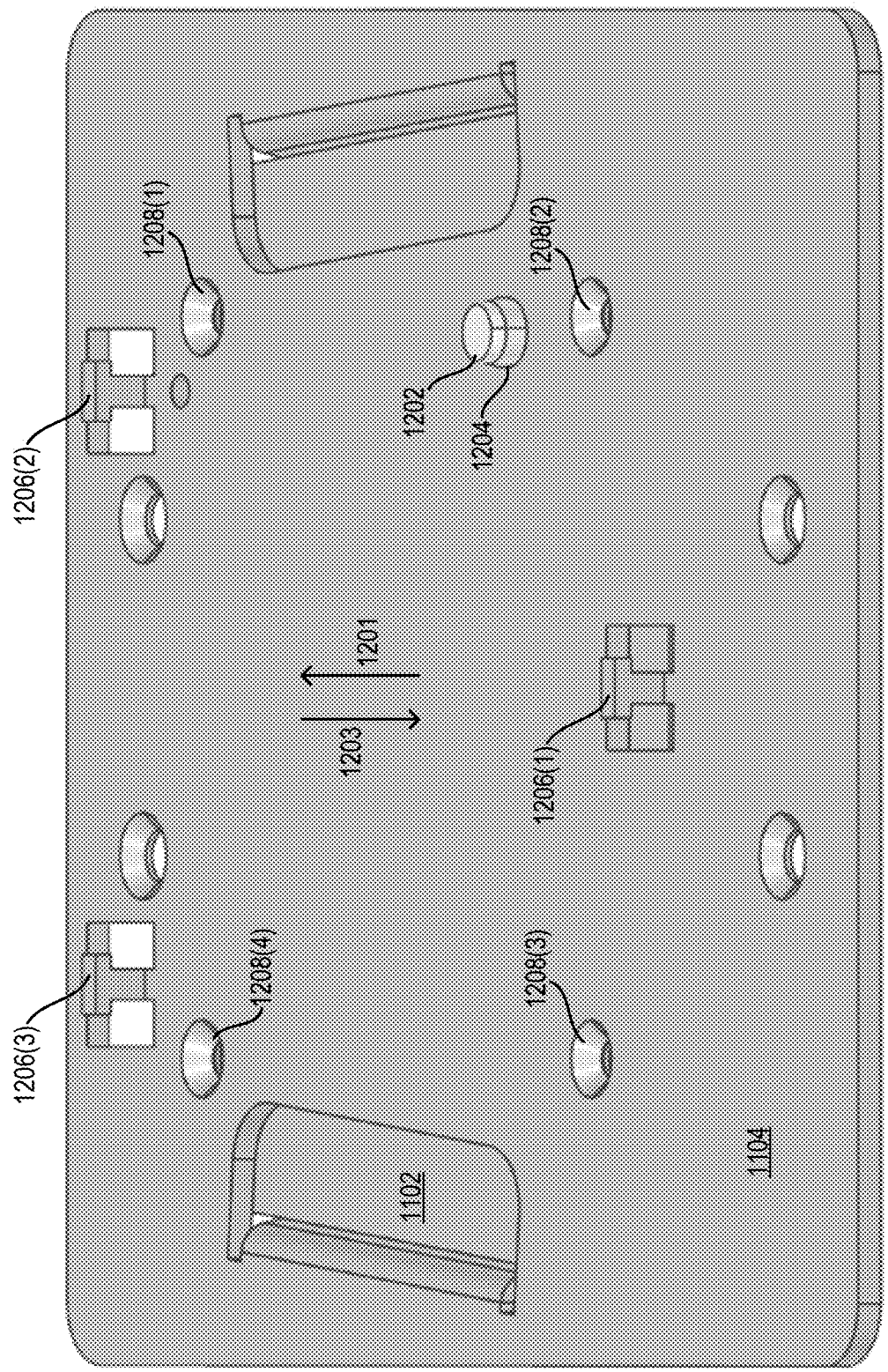
FIG. 12 depicts a top plan view of the mounting system of FIG. 11.
Figure 13:
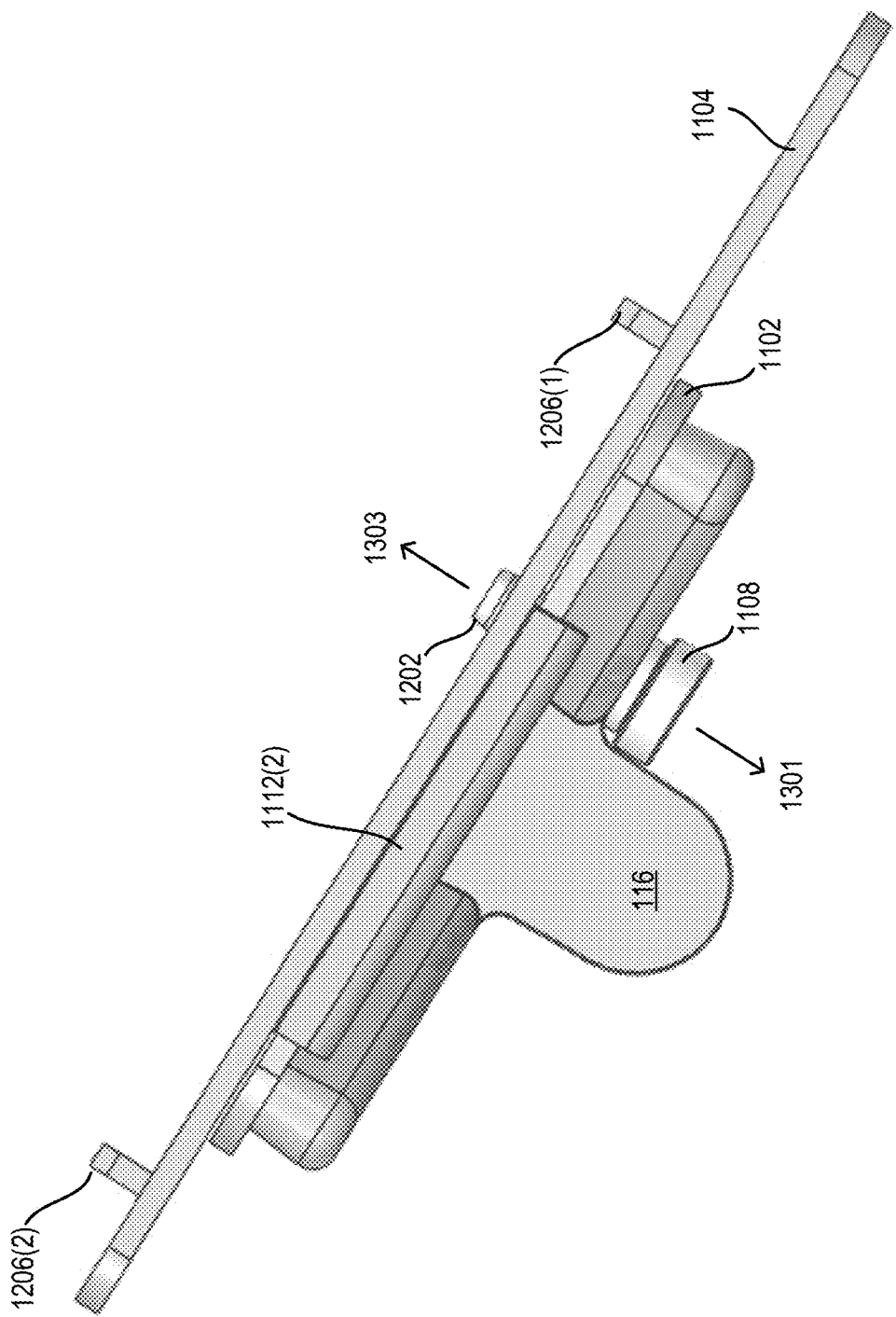
FIG. 13 depicts a left elevation view of the mounting system of FIG. 11.
Figure 14:
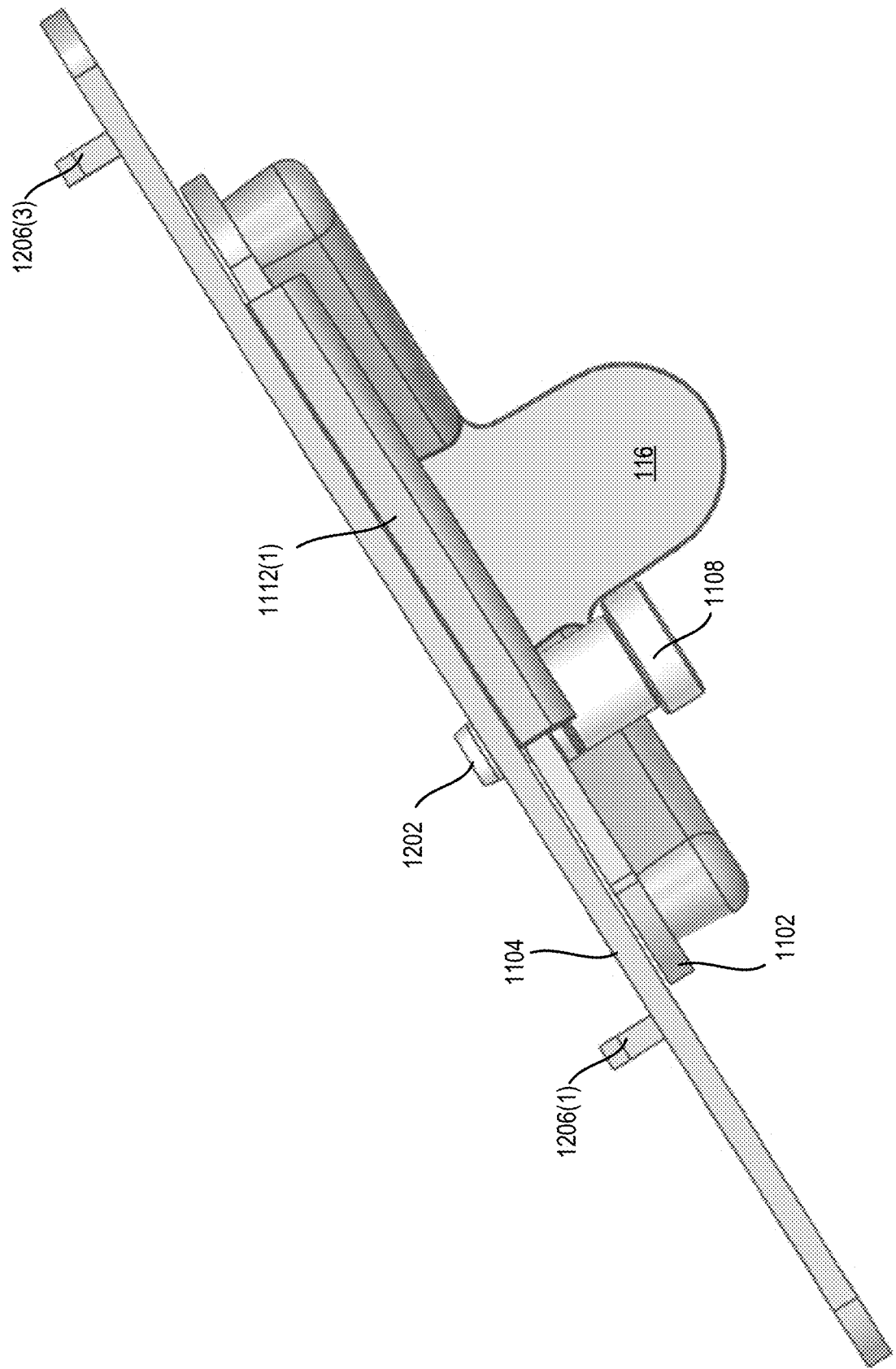
FIG. 14 depicts a right elevation view of the mounting system of FIG. 11.
Figure 15:
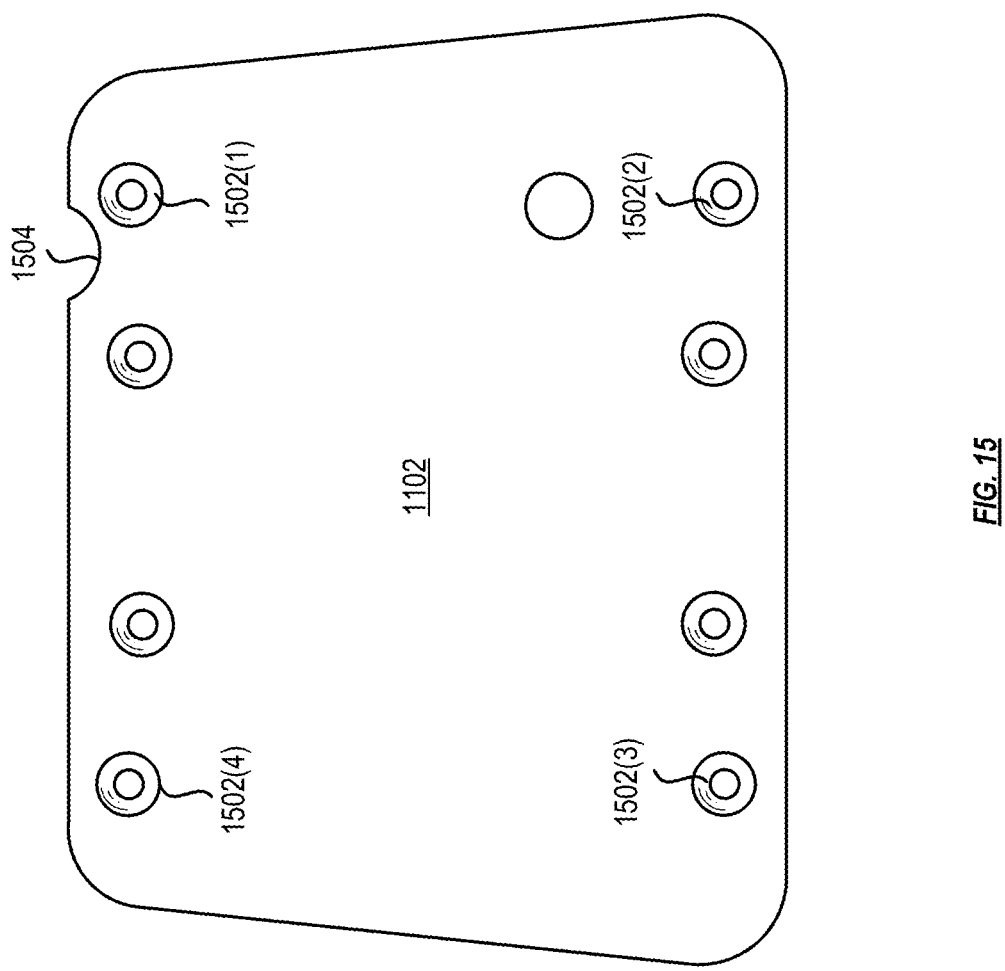
FIG. 15 depicts the bottom plate of the mounting system of FIG. 11, in embodiments.

FIG. 9 depicts a front elevation view of the universal mount 100, of FIG. 1, supporting a point-of-sale accessory 902, in embodiments. FIG. 10 depicts a side elevation view of the universal mount 100, of FIG. 1, supporting the point-of-sale accessor 902, of FIG. 9. FIG. 11 depicts a bottom plan view of a mounting system 1100, used to support the point-of-sale accessory 902 of FIGS. 9-10, in embodiments. FIG. 12 depicts a top plan view of the mounting system 1100 of FIG. 11. FIG. 13 depicts a left elevation view of the mounting system 1100 of FIG. 11. FIG. 14 depicts a right elevation view of the mounting system 1100 of FIG. 11. FIG. 15 depicts the bottom plate of the mounting system 1100 of FIG. 11, in embodiments. FIGS. 9-14 are best viewed together with the following description.

The mounting system 1100 is shown coupled to the mounting plate 106. The mounting system 1100 includes a bottom plate 1102 and a top plate 1104. As shown in FIG. 15, the bottom plate 1106 includes a plurality of bottom-to-base plate mounting apertures 1502(1)-1502(2) that correspond in size and position to the size and position of fastener receptacles 118(1)-118(4), respectively. This allows the bottom plate 1102 to be mounted in stationary position (and removed if desired) to the mounting plate 106. In embodiments, the plurality of bottom-to-base plate mounting apertures 1502(1)-1502(2) are tapered (as shown in FIG. 15) such that the fasteners used to couple the bottom plate 1102 to the mounting plate 106 are concealed within the taper. In other words, the fasteners do not interfere with the top plate 1104 sliding on the bottom plate 1102 because of the taper of the plurality of bottom-to-base plate mounting apertures 1502(1)-1502(2).

The bottom plate 1106 further includes a first pin aperture 1504 for allowing spring-pin 1106 to pass there through. The spring-pin 1106 is attached to the bottom plate 1102 includes knob 1108 projecting from the back surface of the bottom plate 1102 and a pin 1202, actionable by the knob 1108, that projects through the first pin aperture 1504 and a second pin aperture 1204 of the top plate 1104. Accordingly, the knob 1108 can be pulled (away from the bottom plate 1102 in the direction of arrow 1301 in FIG. 13) causing the pin 1204 to retreat through the second pin aperture 1204, thereby allowing the top plate 1104 to slide upwards (i.e. in the direction of arrow 1201 in FIG. 12) and thereby be removed from the bottom plate 1102. Correspondingly, as the top plate 1104 slides onto the bottom plate 1102, the spring within the spring-pin 1106 causes the pin 1204 to extend into the second pin aperture 2304 (in the direction of arrow 1303 in FIG. 13). Thus, the spring-pin 1106 locks the top plate 1104 in place with respect to the bottom plate 1102. It should be appreciated that there may be some clearance between the diameter of the pin 1202 and the second pin aperture 1204.

In embodiments, the bottom plate 1106 further includes a notch 1504 that is configured to contact a protrusion 1110 extending from a bottom surface of the top plate 1104. The notch 1504, by contacting the protrusion 1110, prevents the top plate 1104 from sliding downward (i.e. in the direction of arrow 1203 in FIG. 12). The protrusion 1110 may prevent sliding downward in addition to the pin 1202. The protrusion 1110 may be a part of the top plate 1104, or may be a screw or other piece of material fastened to the top plate 1104.

The top plate 1104 further includes at least two rails 1112(1), 1112(2) that respectively form a channel for each edge 1114(1), 1114(2) of the bottom plate 1102 to fit within. The rails 1112(1) and 1112(2) may be tapered with respect to one another such that upper width between each of the rails 1112(1), 1112(2) is smaller than the lower width between each of the rails 1112(1), 1112(2). The profile of the two edges 1114(1) and 1114(2) may correspond to the taper of the rails 1112(1), 1112(2) such that a width between the upper end of the edges 1114(1), 1114(2) is less than a width between the lower end of the edges 1114(1), 1114(2). This shape of the rails 1112(1), 1112(2) and edges 1114(1), 1114(2) provides another (or additional) means for (in addition to or alternatively from the protrusion 1110 and notch 1504, and the pin 1202) preventing the top plate 1104 from sliding downward with respect to the bottom plate 1102 past a mounting location. The mounting location may be defined by when the pin 1204 extends into the second pin aperture.

The top plate 1104 may include one or more accessory mounting protrusions 1206 that mate with a corresponding recess within the accessory (e.g. accessory 902, thereby coupling the top plate 1104 to the accessory. The top plate 1104 may, in embodiments, include a plurality of top-to-base plate mounting apertures 1208(1)-1208(4) that are similar to the plurality of bottom-to-base plate mounting apertures 1502(1)-1502(4), but allow the top plate 1104 (and the accessory attached thereto) to be directly mounted to the mounting plate 106.

Figure 16:
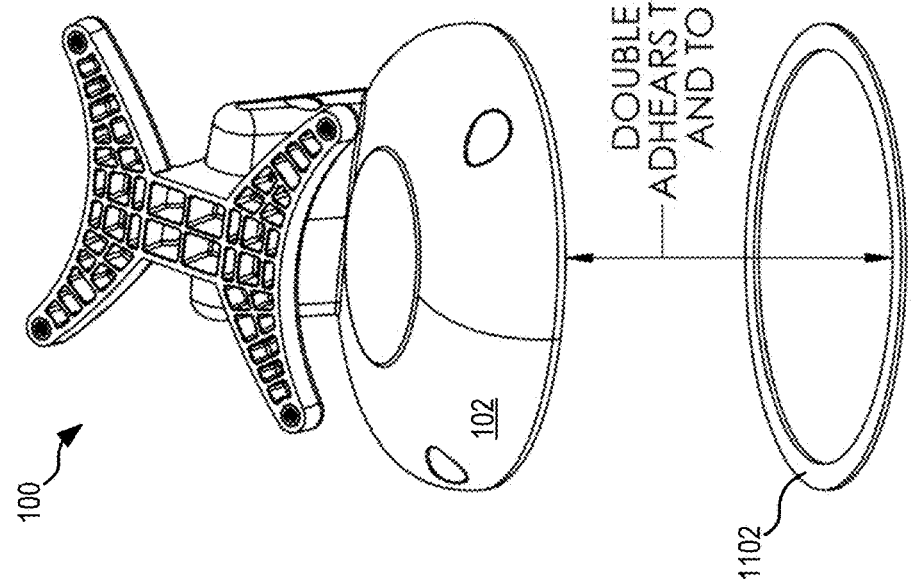
FIG. 16 depicts an embodiment of an adhesive support mount.

FIG. 16 depicts an embodiment of an adhesive support mount 1602. The adhesive support mount 1602 may be an embodiment of the support mount 602 of FIG. 1. The adhesive support mount 1602 may include a double sided adhesive ring that adheres to the structure to which the universal mount 100 is attached to, and a bottom surface of the base 102.

Figure 17:
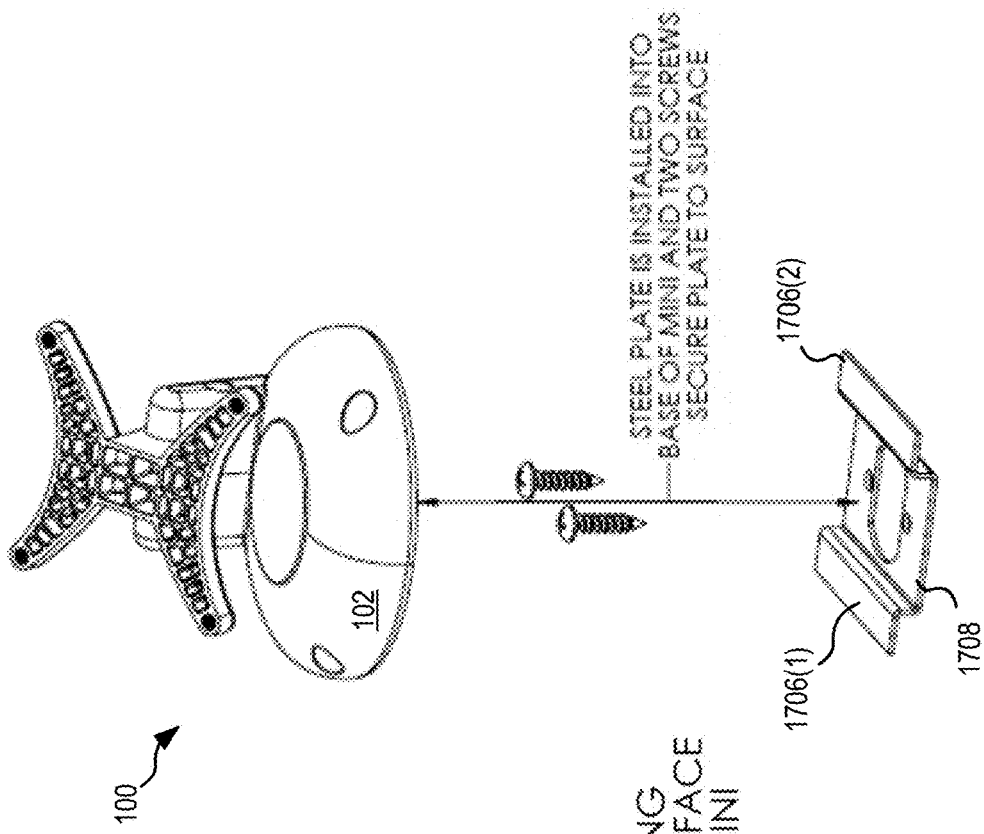
FIG. 17 depicts an embodiment of a support plate mounted with one or more fasteners.

FIG. 17 depicts an embodiment of a support plate 1702 mounted with one or more fasteners 1704. Use of the support plate 1702 may (or may not) prevent swiveling of the base 102. The support plate 1702 may be an embodiment of the support plate 604 of universal mount 100. The support plate 1702 may include a plurality of flanges 1706(1), 1706(2) and a support plate base 1708 offset therefrom. There may be more or fewer flanges 1706 without departing from the scope hereof. The plurality of flanges 1706 are sized and shaped to fit within the channels 606 discussed above. The fasteners 1704 secure the base plate 1708 to the structure to which the universal mount 100 is to be secured to. There may be more or fewer fasteners 1704 without departing from the scope hereof.

Figure 18:
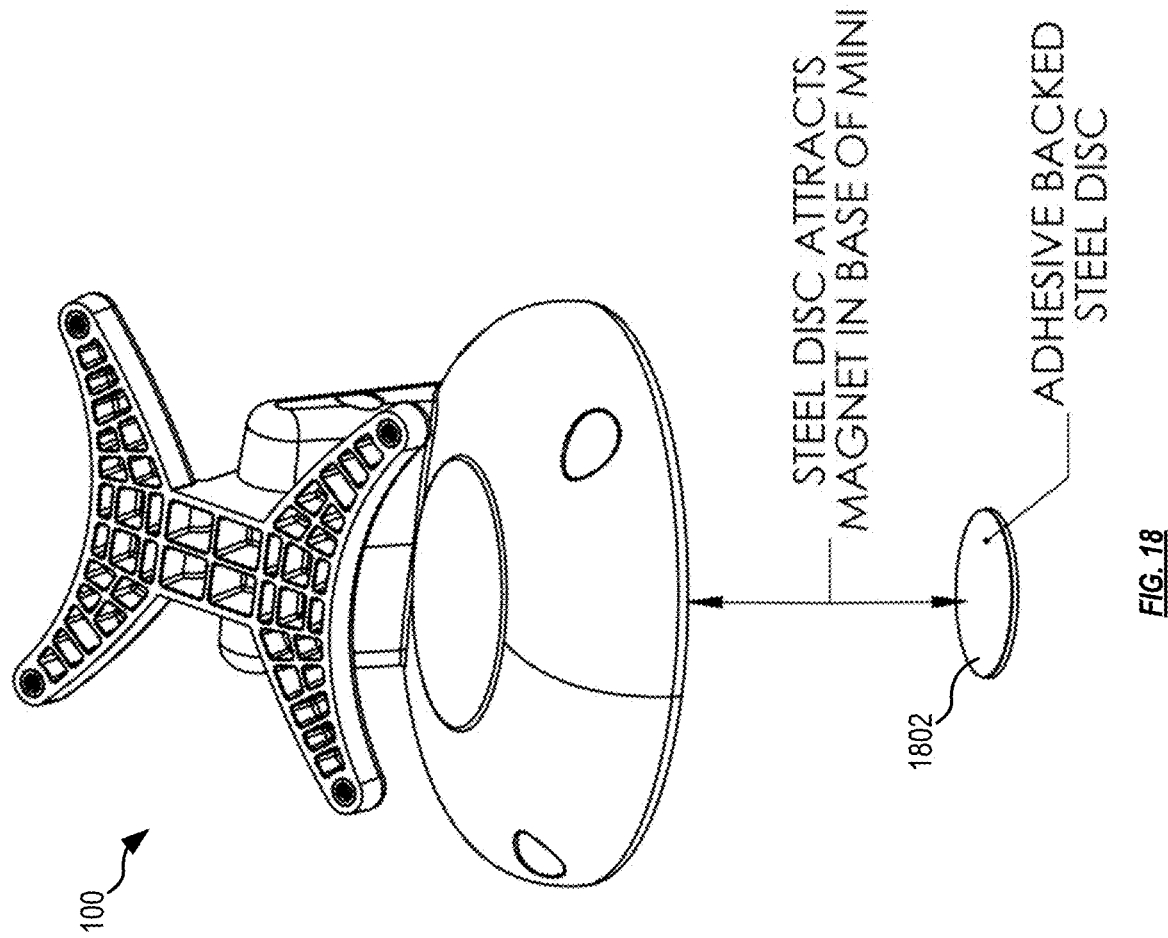
FIG. 18 depicts an embodiment of a magnetic mount disc.

FIG. 18 depicts an embodiment of a magnetic mount disc 1802. The magnetic mount disc 1802 may be magnetically attracted (e.g., a steel disc) to a magnet in the support mount 602 of the universal mount 100. The magnetic mount disc 1802 may be adhered to the structure to which the universal mount 100 is to be coupled with. The magnetic mount disc 1802 allows the universal mount 100 to be removed from the structure without removing fasteners. The magnetic mount disc 1802 (and corresponding support mount 602) may be any other shape, and not just a disc as shown. Moreover, there may be more or fewer magnetic mount discs 1802 (and corresponding support mounts 602) without departing from the scope hereof.

Figure 19:
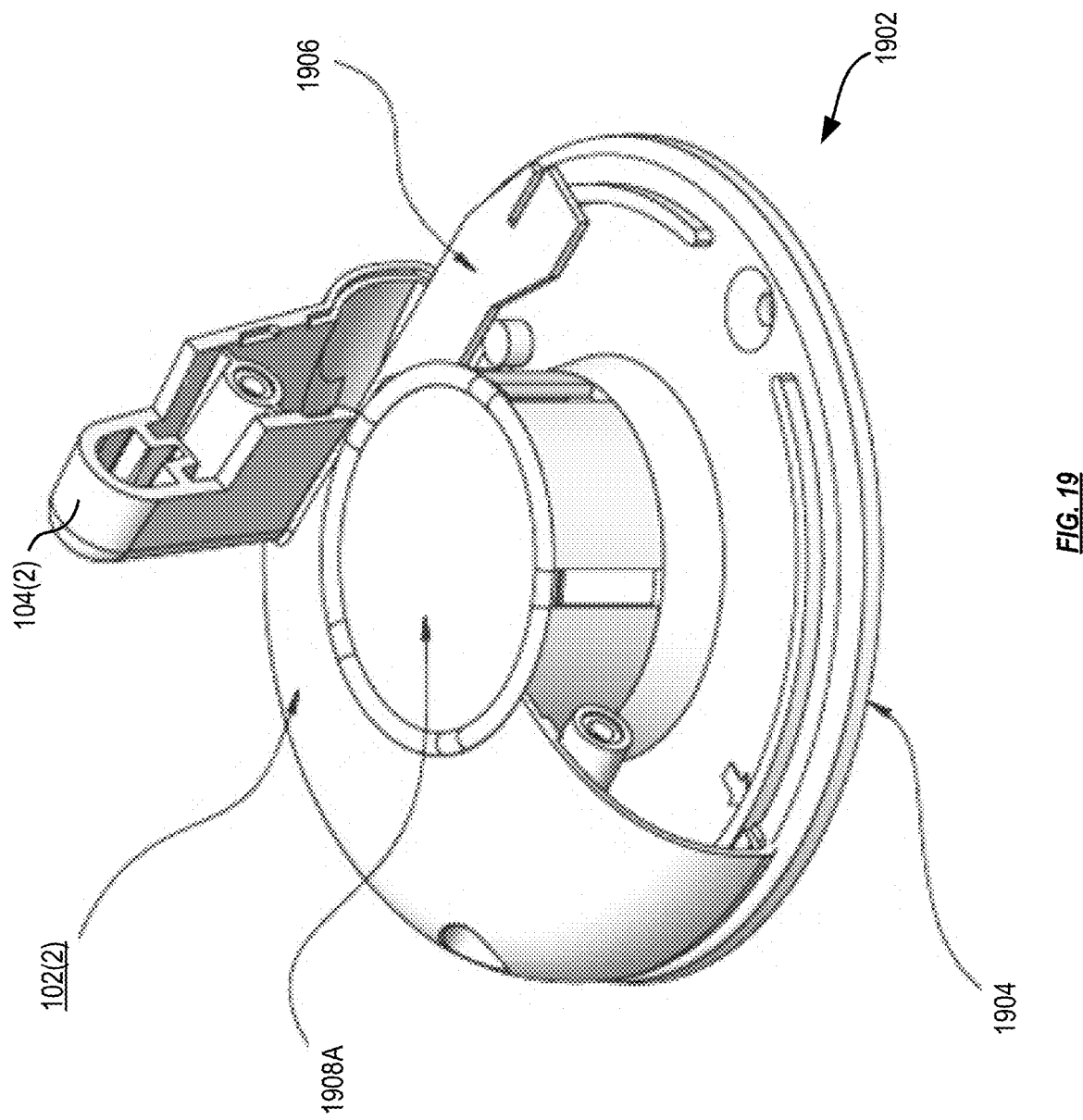
FIG. 19 depicts an example support mount for use with the universal mount of FIG. 1, in embodiments.

FIG. 19 depicts an example support mount 1900 for use with the universal mount 100, of FIG. 1, in embodiments. Support mount 1900 includes the base 102 and the mounting extension 104, discussed above. Only base 102(2) and mounting extension 104(2) are shown in FIG. 19 to depict support mount 1902. Support mount 1902 is an example of support mount 602, discussed above. Support mount 1902 includes a mounting plate 1904, a stop clip 1906, and a mounting cap 1908A.

Figure 20:
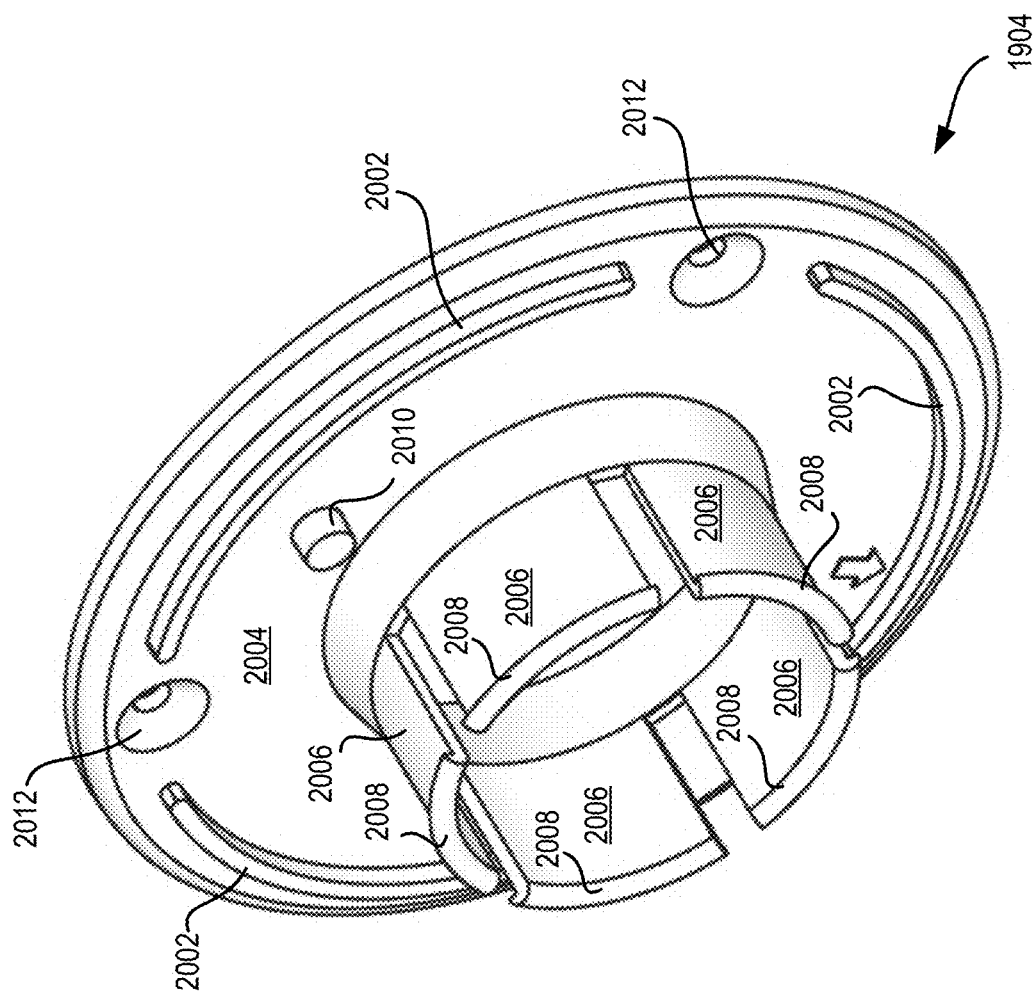
FIG. 20 depicts the mounting plate of FIG. 19, in further detail, in embodiments.

FIG. 20 depicts the mounting plate 1904, of FIG. 19, in further detail, in embodiments. The mounting plate 1904 includes one or more guides 2002 at an outer perimeter of the mounting plate 1904. Three guides 2002 are shown, but there may be more or fewer without departing from the scope hereof. The guides 2002 are shown as protrusions extending from the upper surface 2004 of the mounting plate. The guides interface with a bottom edge 1910 (shown in FIG. 19) of the base 102.

The mounting plate 1904 further includes one or more tabs 2006 extending from an inner location of the surface 2004. Tabs 2006 interface with upper edge 1912 of the base 102. Tabs 2006 may have lip 2008 such that once base 102 is coupled with plate 1904, the base 102 is secured thereon and may be removed by pressing each lip 2008 towards one another. Although there are five tabs 2006 and lips 2008, there may be more or fewer without departing from the scope hereof.

In embodiments, the mounting plate 1904 may further include a stop protrusion 2010 extending from the surface 2004. Stop protrusion 2010 interfaces with the stop clip 1906 to prevent the base 102 from rotating more than 360 degrees (or past a desired angle, depending on the location of the stop protrusion 2010. Moreover, there may be more than a single stop protrusion 2010 without departing from the scope hereof to control a range of rotation of the base 102 with respect to the mounting plate 1904.

In embodiments, the mounting plate 1904 may further include one or more fastener apertures 2012 for mounting the mounting plate 1904 to a desired surface.

Figure 21:
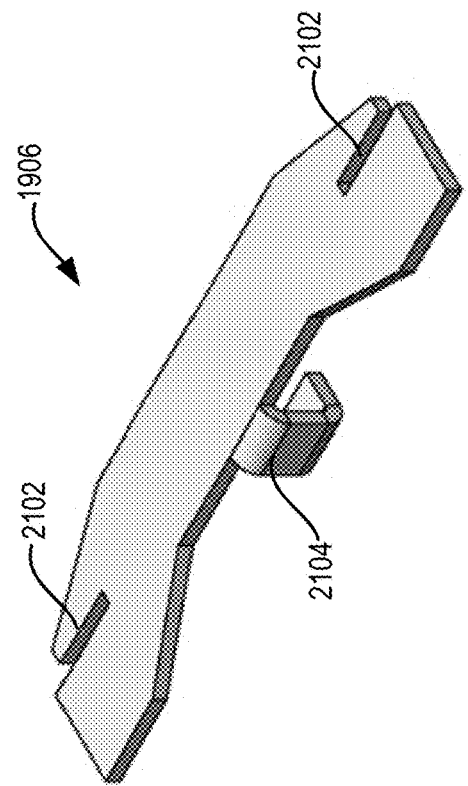
FIG. 21 depicts the stop clip of FIG. 19, in further detail in embodiments.

FIG. 21 depicts the stop clip 1906, of FIG. 19, in further detail in embodiments. The stop clip 1906 couples to the base 102 (e.g. via notches 2102 interacting with a protrusion inside each respective base 102(1), 102(2). The stop clip 1906 may include a tab 2104 that interfaces (e.g., hits, or abuts) the stop protrusion 2010 to prevent rotation of the base 102 with respect to the mounting plate 1904.

Figure 22A:
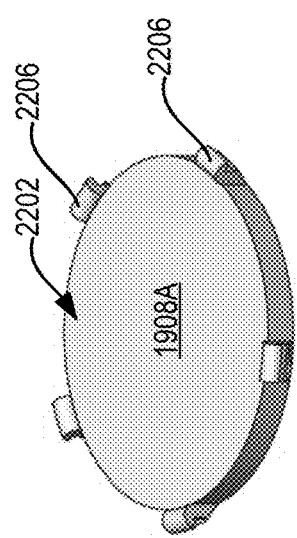
FIGS. 22A-B depict embodiments of the cap of FIG. 19, in further detail in embodiments.
Figure 22B:
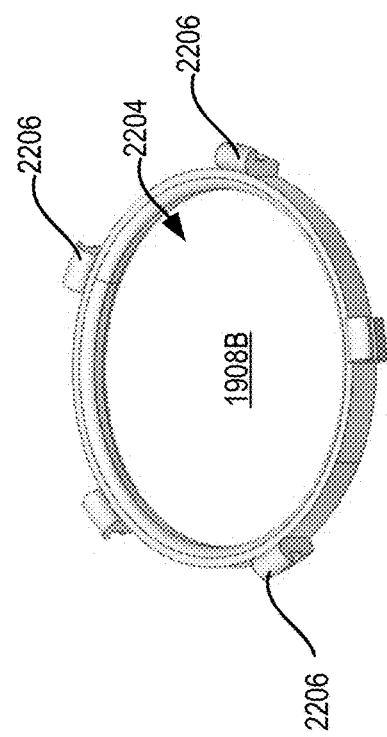

FIG. 22A depicts the cap 1908A, of FIG. 19, in further detail in an embodiment where the cap 1908A includes a surface 2202 spanning the entire diameter of the cap 1908A. FIG. 22B depicts another embodiment of the cap 1908B where there is an aperture 2204 in the cap 1908B such that cables may extend through the cap 1908B. Caps 1908A, 1908B include a plurality of tabs 2206 and are configured to be inserted in the aperture of base 102. The diameter (or other dimension) of caps 1908A, 1908B are equal to or slightly larger than the diameter of the aperture of base 102 such that the caps 1908A, 1908B are retained on the base 102. Tabs 2206 may correspond in size and location to one or more spaces between each of tabs 2008 of mounting plate 1904.

Figure 24:
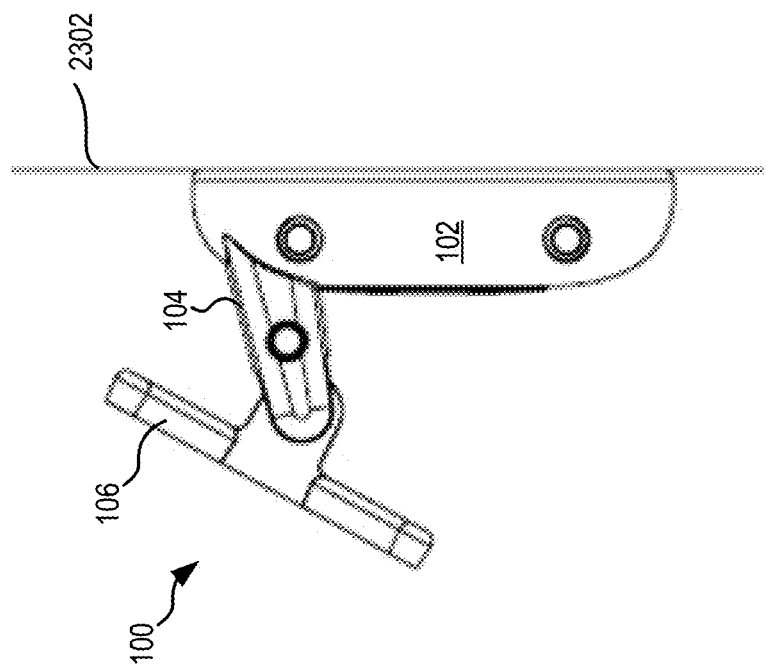
FIGS. 23 and 24 depict the mounting flexibility of the universal mount of FIGS. 1-22.
Figure 23:
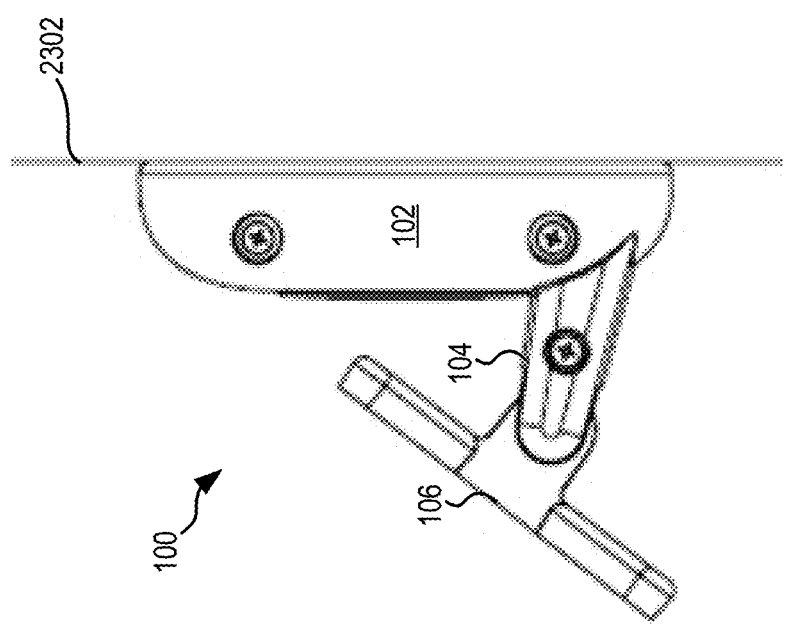

FIGS. 23 and 24 depict the mounting flexibility of the universal mount 100 of FIGS. 1-22. In FIG. 23, the universal mount 100 is mounted vertically to a structure 2302 with the mounting extension 104 located at the bottom of the base 102. Because the mounting plate 106 is capable of rotating about the pin 114, discussed above, the angle of the accessory mounted thereon can be appropriately facing upwards towards a user. Similarly, the angle can be maintained even if the mounting extension 104 is located at the top of the base 102, as shown in FIG. 24.

Figure 25:
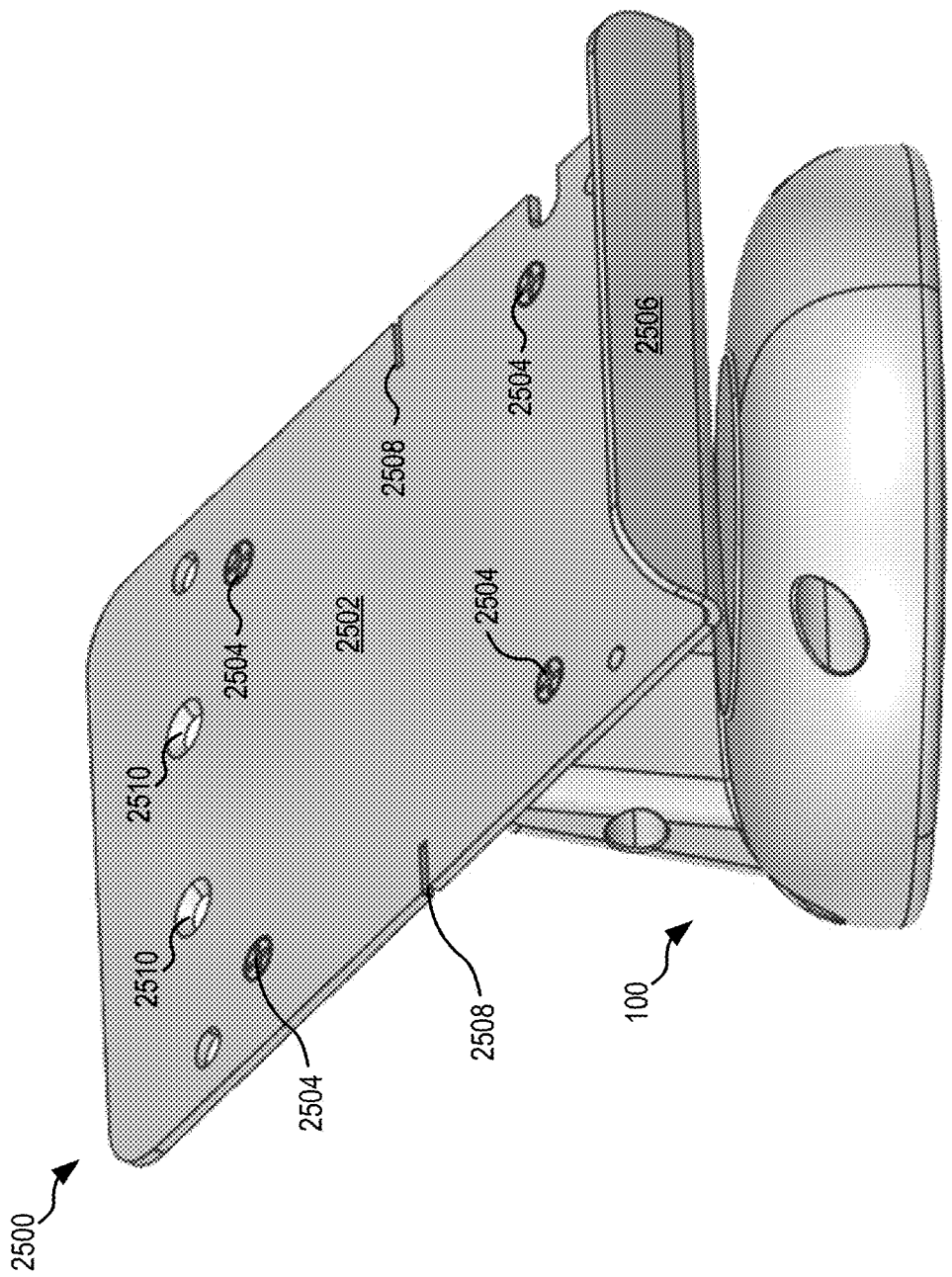
FIG. 25 depicts a perspective view of the universal mount of FIG. 1 supporting another mounting accessory, in embodiments.

FIG. 25 depicts a perspective view of the universal mount 100 of FIG. 1 supporting a mounting accessory 2500, in embodiments. FIG. 26 depicts a top elevation view of the mounting accessory 2500 of FIG. 25, in embodiments. FIG. 25 depicts a side plan view of the mounting accessory of FIGS. 25-26, in embodiments.

The mounting accessory 2500 includes a back portion 2502 with fastener apertures 2602 such that the mounting accessory 2500 couples to the mounting plate 106 via fasteners 2504. The mounting accessory 2500 includes a back portion 2504 and a shelf portion 2506. The side (and/or optionally top/bottom) portions may include grooves 2508 for securing device(s) to the mounting accessory 2500. There may be an additional notch 2604 that prevents movement of the device attached to the mounting accessory 2500. The back portion 2502 may have additional apertures 2510 for receiving additional fasteners to secure device(s) to the mounting accessory 2500.

Figure 28:
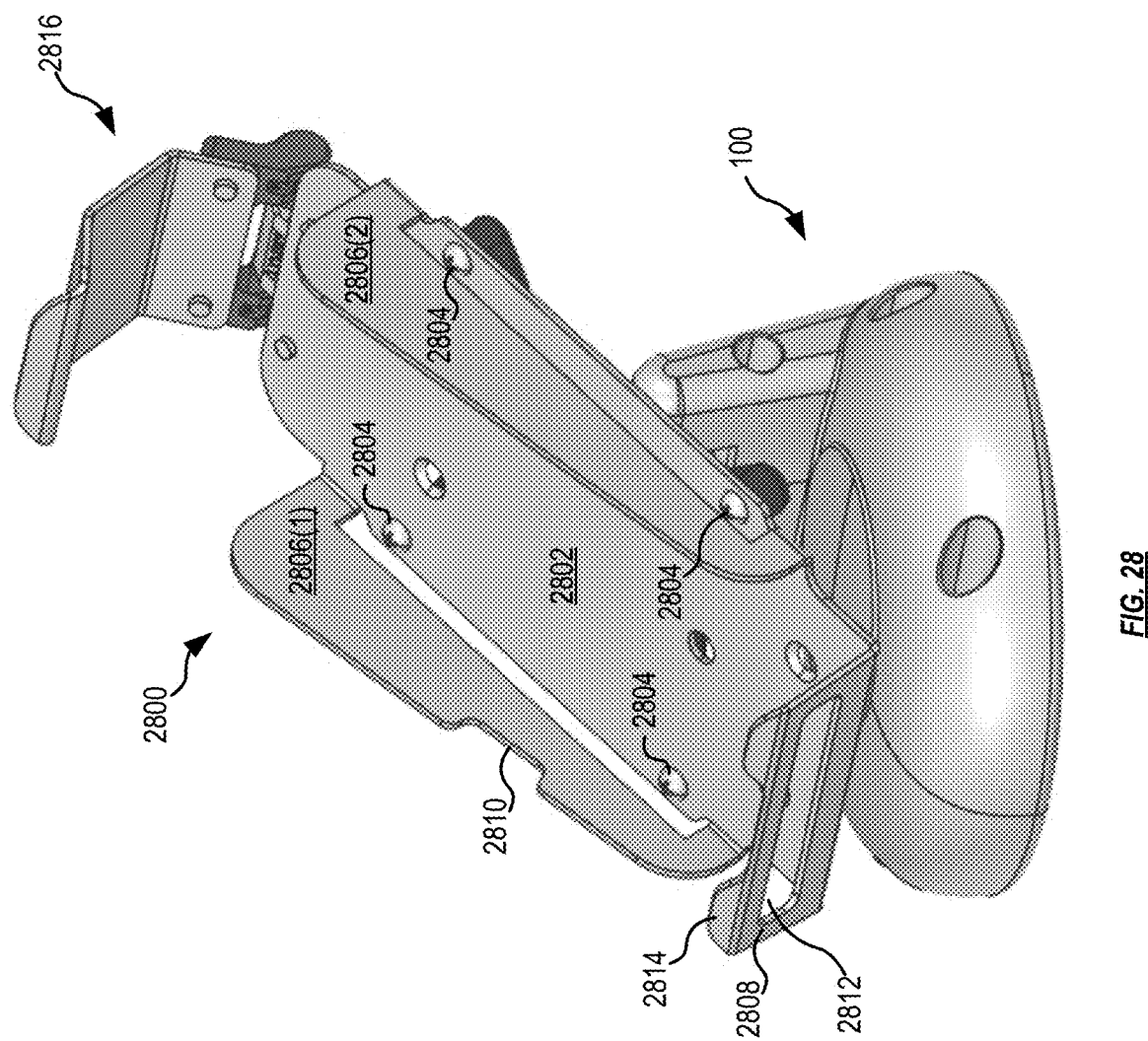
FIG. 28 depicts a perspective view of the universal mount of FIG. 1 supporting a mounting accessory, in embodiments.
Figure 30:
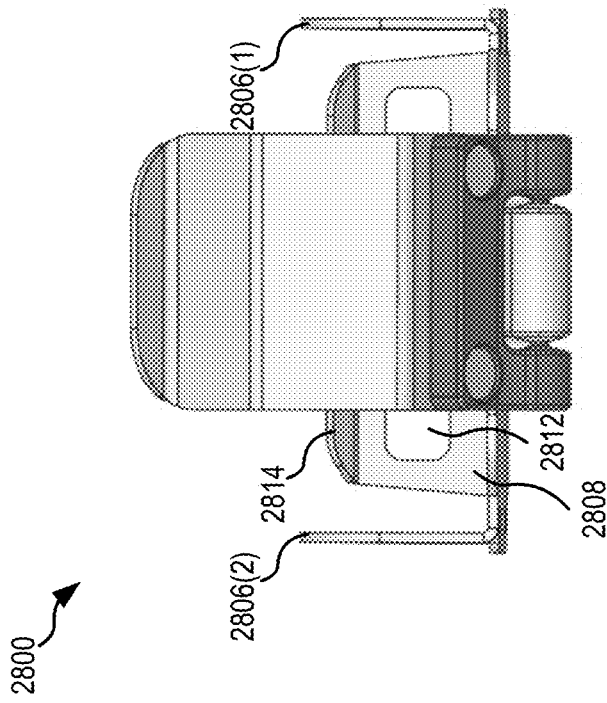
FIG. 30 depicts a rear plan view of the mounting accessory of FIG. 28, in embodiments.
Figure 29:
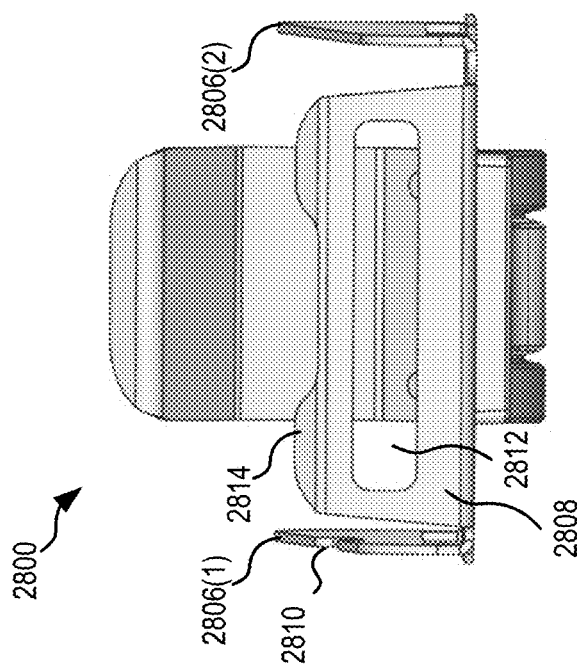
FIG. 29 depicts a front plan view of the mounting accessory of FIG. 28, in embodiments.

FIG. 28 depicts a perspective view of the universal mount 100 of FIG. 1 supporting a mounting accessory 2800, in embodiments. FIG. 29 depicts a front plan view of the mounting accessory 2800, in embodiments. FIG. 30 depicts a rear plan view of the mounting accessory 2800 in embodiments. FIG. 31 depicts a top elevation of the mounting accessory 2800, in embodiments. FIG. 32 depicts a side view of the mounting accessory 2800, in embodiments. FIGS. 28-32 are best viewed together with the following discussion.

The mounting accessory 2800 includes a back portion 2802 with fastener apertures 3102 such that the mounting accessory 2800 couples to the mounting plate 106 via fasteners 2804. The back portion 28025 may have additional apertures 3104 for receiving additional fasteners to secure device(s) to the mounting accessory 2500. Extending from the back portion 2802 are two side portions 2806(1), 2806(2) and a bottom portion 2808. The side portions 2806 and the bottom portion 2808 are shown orthogonal to the back portion 2802, but may be at other angles without departing from the scope hereof. One or both of the side portions 2806 may include a mounting notch 2810 that interfaces with a profile of a mounted device, or provides access to features (such as buttons, connectors, etc.) to the mounted device secured within the mounting accessory 2800. The bottom portion may include an aperture 2812 therein that provides access to cables powering or otherwise connecting the mounted device secured within the mounting accessory 2800. The bottom portion 2808 may also include a lip extending from a distal end of the bottom portion 2808 with respect to the back portion 2802.

The back portion 2802 may further have a top portion 2816 on an opposite end of the bottom portion 2808. The top portion 2816 may include a top clip plate 2818 coupled to the back portion 2802 via a hinge 2820. The hinge 2820 may be lockable such that the device held to the mounting assembly 100 is not removable without a special key (or tool). The top clip plate 2818 may be contoured to match the shape of the device mounted therein. It should be appreciated that the shape and/or contour of the back portion 2802, side portions 2806, bottom portion 2808, and/or top portion 2816 may be different than shown to match the profile/shape of the device mounted therein without departing from the scope hereof.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A universal mount, comprising:
   a base including a support mount the support mount including:
      a plurality of tabs having lips that interface with an upper edge of the base,
      at least one guide that interfaces with a lower edge of the base,
      a stop clip that interfaces with a stop protrusion to limit rotation of the base with respect to the support mount, and
      a cover that covers support mounting components within the base;
   a mount extension integral to and extending from the base; and,
   a mounting plate rotatably coupled to the mount extension.

2. The universal mount of claim 1, the base including a first base piece and a second base piece, and the mount extension including a first mount extension piece and a second mount extension piece, that are configured to couple together via one or more fasteners.

3. The universal mount of claim 1, the support mount fastened to a support plate.

4. The universal mount of claim 3, the support plate retained in the base via one or more channels integral to an inner surface of the base.

5. The universal mount of claim 1, the support mount including a magnet.

6. The universal mount of claim 5, the magnet being housed in a magnet housing fastened to the support plate.

7. The universal mount of claim 1, the support mount including one or more fasteners configured to secure the support plate to a structure.

8. The universal mount of claim 7, the support plate including a plurality of flanges and a support plate base offset therefrom.

9. The universal mount of claim 1, the mounting plate coupled to the mount extension via a rod.

10. The universal mount of claim 9, the rod providing friction such that the mounting plate maintains an angle with respect to the base.

11. The universal mount of claim 9, the rod being a clip friction hinge.

12. The universal mount of claim 1, the base coupled to an adhesive support mount.

13. The universal mount of claim 1, further including a mounting system coupled to the mounting plate, the mounting system including a bottom plate; and a top plate removable from the bottom plate and configured to mount an accessory thereon.

14. A universal mount, comprising:
   a base including a support mount, the support mount including a magnet, the support mount including:
      a plurality of tabs having lips that interface with an upper edge of the base,
      at least one guide that interfaces with a lower edge of the base, and,
      a stop clip that interfaces with a stop protrusion to limit rotation of the base with respect to the support mount;
   a mount extension integral to and extending from the base; and,
   a mounting plate rotatably coupled to the mount extension.

15. A universal mount, comprising:
a base including a support mount the support mount including:
a plurality of tabs having lips that interface with an upper edge of the base,
at least one guide that interfaces with a lower edge of the base,
a stop clip that interfaces with a stop protrusion to limit rotation of the base with respect to the support mount;
a mount extension integral to and extending from the base;
a mounting plate rotatably coupled to the mount extension; and
a mounting system coupled to the mounting plate, the mounting system including a bottom plate; and a top plate removable from the bottom plate and configured to mount an accessory thereon.

16. The universal mount of claim 15, the bottom plate including a plurality of bottom-to-base mounting apertures corresponding in size and position respectively to a plurality of fastener receptacles on the mounting plate; the mounting system further including a plurality of fasteners configured to fasten the bottom plate to the mounting plate at the bottom-to-base mounting apertures.

17. The universal mount of claim 16, the plurality of bottom-to-base mounting apertures including a taper to prevent interference of the fasteners with movement of the top plate.

18. The universal mount of claim 15, the mounting system including a spring-pin attached to the bottom plate at a first pin aperture of the bottom plate; the spring-pin including a knob extending away from a first surface of the bottom plate and a pin actionable by the knob and configured to extend through a second pin aperture of the top plate when the top plate is mounted on the bottom plate.

19. The universal mount of claim 18, the spring pin further configured to prevent removal of the top plate from the bottom plate unless the pin is retracted through the second pin aperture.

20. The universal mount of claim 15, the bottom plate further including a notch at an edge thereof that is configured to contact a protrusion extending from a surface of the top plate to prevent sliding of the top plate with respect to the bottom plate.

21. The universal mount of claim 15, the top plate including at least two rails that form a channel; the channel sized and positioned such that opposite edges of the bottom plate fit within the channel.

22. The universal mount of claim 21, the opposite edges of the bottom plate and the two rails being tapered such that the taper prevents the top plate from sliding with respect to the bottom plate past a mounting location.

23. The universal mount of claim 22, the mounting location defined as the location of the top plate with respect to the bottom plate that a pin extends through a pin aperture within the top plate.

* * * * *